United States Patent
Yoshioka et al.

(10) Patent No.: US 12,309,714 B2
(45) Date of Patent: May 20, 2025

(54) TERMINAL, SYSTEM, AND COMMUNICATION METHOD FOR TRANSMISSION POWER CONTROL FOR A SIDELINK REFERENCE SIGNAL

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 370 days.

(21) Appl. No.: 17/628,407

(22) PCT Filed: Jul. 22, 2019

(86) PCT No.: PCT/JP2019/028716
§ 371 (c)(1),
(2) Date: Jan. 19, 2022

(87) PCT Pub. No.: WO2021/014547
PCT Pub. Date: Jan. 28, 2021

(65) Prior Publication Data
US 2022/0417867 A1    Dec. 29, 2022

(51) Int. Cl.
*H04W 52/32* (2009.01)
*H04W 52/10* (2009.01)
(Continued)

(52) U.S. Cl.
CPC ......... *H04W 52/325* (2013.01); *H04W 52/10* (2013.01); *H04W 52/242* (2013.01); *H04W 72/1263* (2013.01); *H04W 92/18* (2013.01)

(58) Field of Classification Search
CPC . H04W 52/325; H04W 52/10; H04W 52/242; H04W 72/1263; H04W 92/18;
(Continued)

(56) References Cited

U.S. PATENT DOCUMENTS

| | | | |
|---|---|---|---|
| 2019/0182777 A1* | 6/2019 | Zhang | H04L 5/006 |
| 2019/0229964 A1* | 7/2019 | Ouchi | H04L 5/0051 |
| 2019/0393939 A1* | 12/2019 | Huang | H04W 52/42 |

FOREIGN PATENT DOCUMENTS

WO    2020013641 A1    1/2020

OTHER PUBLICATIONS

Office Action issued in counterpart Chinese Patent Application No. 201980098539.6 mailed on Jul. 6, 2023 (14 pages).
(Continued)

*Primary Examiner* — Michael Y Mapa
(74) *Attorney, Agent, or Firm* — Osha Bergman Watanabe & Burton LLP

(57) ABSTRACT

A terminal includes a control unit that sets, when data transmitted on a sidelink shared channel is frequency division multiplexed with a sidelink reference signal in a symbol to which the sidelink shared channel is mapped, a first value of α transmit power for transmitting the reference signal to a same value as or a different value from a second value of α transmit power for transmitting the data; and a transmitting unit that transmits the reference signal and the data, wherein the transmitting unit applies the first value of the transmit power to the reference signal and applies the second value of the transmit power to the data.

4 Claims, 23 Drawing Sheets

(51) Int. Cl.
*H04W 52/24* (2009.01)
*H04W 72/1263* (2023.01)
*H04W 92/18* (2009.01)

(58) Field of Classification Search
CPC ..... H04W 52/383; H04W 4/40; H04W 52/08; H04W 72/20; H04W 52/281; H04W 72/25; H04L 5/0044; H04L 5/0048; H04L 5/0053
USPC .......... 370/318; 455/13.4, 127.1, 450–452.2, 455/464, 522
See application file for complete search history.

(56) References Cited

OTHER PUBLICATIONS

Extended European Search Report issued in counterpart European Patent Application No. 19938413.2, mailed on Mar. 3, 2023 (8 pages).
LG Electronics; "Discussion on physical layer structure for NR sidelink"; 3GPP TSG RAN WG1 #97, R1-1907012; Reno, USA; May 13-17, 2019 (25 pages).
International Search Report issued in PCT/JP2019/028716 on Feb. 25, 2020 (5 pages).
Written Opinion of the International Searching Authority issued in PCT/JP2019/028716 on Feb. 25, 2020 (4 pages).
Samsung; "On Physical Layer Procedures for NR V2X"; 3GPP TSG RAN WG1 #97, R1-1906941; Reno, USA; May 13-17, 2019 (16 pages).
Panasonic; "Discussion on physical layer procedures for sidelink in NR V2X"; 3GPP TSG RAN WG1 #97, R1-1906404; Reno, USA; May 13-17, 2019 (4 pages).
3GPP TS 36.213 V15.2.0; "3rd Generation Partnership Project; Technical Specification Group Radio Access Network; Evolved Universal Terrestrial Radio Access (E-UTRA); Physical layer procedures (Release 15)" Jun. 2018 (541 pages).
3GPP TS 38.211 V15.6.0; "3rd Generation Partnership Project; Technical Specification Group Radio Access Network; NR; Physical channels and modulation (Release 15)" Jun. 2019 (97 pages).
3GPP TS 38.214 V15.5.0; "3rd Generation Partnership Project; Technical Specification Group Radio Access Network; NR; Physical layer procedures for data (Release 15)" Mar. 2019 (103 pages).
3GPP TS 38.331 V15.5.1; "3rd Generation Partnership Project; Technical Specification Group Radio Access Network; NR; Radio Resource Control (RRC) protocol specification (Release 15)" Apr. 2019 (491 pages).
Office Action issued in counterpart Japanese Patent Application No. 2021-534439 mailed on Feb. 13, 2024 (5 pages).

\* cited by examiner

SELECT RADIO RESOURCE FROM SYNCHRONIZED COMMON TIME/FREQUENCY GRID

FIG.10

For sidelink transmission mode 3, the UE transmit power $P_{\text{PSSCH}}$ for PSSCH transmission is given by $$P_{\text{PSSCH}} = 10\log_{10}\left(\frac{M_{\text{PSSCH}}}{M_{\text{PSSCH}} + 10^{\frac{3}{10}} \times M_{\text{PSCCH}}}\right) \quad [\text{dBm}],$$

$$+ \min\left\{P_{\text{CMAX}}, \quad 10\log_{10}\left(M_{\text{PSSCH}} + 10^{\frac{3}{10}} \times M_{\text{PSCCH}}\right) + P_{\text{O\_PSSCH},3} + \alpha_{\text{PSSCH},3} \cdot PL\right\}$$

where $P_{\text{CMAX}}$ is defined in [6], and $M_{\text{PSSCH}}$ is the bandwidth of the PSSCH resource assignment expressed in number of resource blocks and $PL = PL_c$ where $PL_c$ is defined in Subclause 5.1.1.1. $P_{\text{O\_PSSCH},3}$ and $\alpha_{\text{PSSCH},3}$ are provided by higher layer parameters *pOSL-V2V* and *alphaSL-V2V*, respectively and that are associated with the corresponding PSSCH resource configuration.

For sidelink transmission mode 4, the UE transmit power $P_{\text{PSSCH}}$ for PSSCH transmission in subframe $n$ is given by $$P_{\text{PSSCH}} = 10\log_{10}\left(\frac{M_{\text{PSSCH}}}{M_{\text{PSSCH}} + 10^{\frac{3}{10}} \times M_{\text{PSCCH}}}\right) + A \quad [\text{dBm}],$$

where $P_{\text{CMAX}}$ is defined in [6], $M_{\text{PSSCH}}$ is the bandwidth of the PSSCH resource assignment expressed in number of resource blocks, $M_{\text{PSCCH}} = 2$, and $PL = PL_c$ where $PL_c$ is defined in Subclause 5.1.1.1. $P_{\text{O\_PSSCH},4}$ and $\alpha_{\text{PSSCH},4}$ are provided by higher layer parameters *pOSL-V2V* and *alphaSL-V2V*, respectively and that are associated with the corresponding PSSCH resource configuration. If higher layer parameter *maxTxpower* is configured then $$A = \min\left\{P_{\text{CMAX}}, P_{\text{MAX\_CBR}}, 10\log_{10}\left(M_{\text{PSSCH}} + 10^{\frac{3}{10}} \times M_{\text{PSCCH}}\right) + P_{\text{O\_PSSCH},4} + \alpha_{\text{PSSCH},4} \cdot PL\right\}$$

else $$A = \min\left\{P_{\text{CMAX}}, 10\log_{10}\left(M_{\text{PSSCH}} + 10^{\frac{3}{10}} \times M_{\text{PSCCH}}\right) + P_{\text{O\_PSSCH},4} + \alpha_{\text{PSSCH},4} \cdot PL\right\}$$

where $P_{\text{MAX\_CBR}}$ is set to a *maxTxpower* value based on the priority level of the PSSCH and the CBR range which includes the CBR measured in subframe $n$-4.

FIG.11A

6.4.1.2.2 Mapping to physical resources

6.4.1.2.2.1 Precoding and mapping to physical resources if transform precoding is not enabled The UE shall transmit phase-tracking reference signals only in the resource blocks used for the PUSCH, and only if the procedure in [6, TS 38.214] indicates that phase-tracking reference signals are being used.

The PUSCH PT-RS shall be mapped to resource elements according to $$\begin{bmatrix} a_{k,l}^{(p_0,\mu)} \\ \vdots \\ a_{k,l}^{(p_{\rho-1},\mu)} \end{bmatrix} = \beta_{PT\text{-}RS} W \begin{bmatrix} r^{(\tilde{p}_0)}(2n+k') \\ \vdots \\ r^{(\tilde{p}_{\nu-1})}(2n+k') \end{bmatrix}$$

$$k = \begin{cases} 4n + 2k' + \Delta & \text{configuration type 1} \\ 6n + k' + \Delta & \text{configuration type 2} \end{cases}$$

when all the following conditions are fulfilled

- $l$ is within the OFDM symbols allocated for the PUSCH transmission
- resource element $(k,l)$ is not used for DM-RS
- $k'$ and $\Delta$ correspond to $\tilde{p}_0, \ldots, \tilde{p}_{\nu-1}$ The quantities $k'$ and $\Delta$ are given by Tables 6.4.1.1.3-1 and 6.4.1.1.3-2, the configuration type is given by the higher-layer parameter *DMRS-UplinkConfig*, and the precoding matrix $W$ is given by clause 6.3.1.5. The quantity $\beta_{PTRS}$ is an amplitude scaling factor to conform with the transmit power specified in clause 6.2.2 of [6, TS 38.214].

FIG.11B

When the UE is scheduled with a PT-RS port associated with the PDSCH,

- if the UE is configured with the higher layer parameter *epre-Ratio*, the ratio of PT-RS EPRE to PDSCH EPRE per layer per RE for PT-RS port ($\rho_{PTRS}$) is given by Table 4.1-2 according to the *epre-Ratio*, the PT-RS scaling factor $\beta_{PTRS}$ specified in subclause 7.4.1.2.2 of [4, TS 38.211] is given by $\beta_{PTRS} = 10^{\frac{\rho_{PTRS}}{20}}$.

- otherwise, the UE shall assume *epre-Ratio* is set to state '0' in Table 4.1-2 if not configured.

Table 4.1-2: PT-RS EPRE to PDSCH EPRE per layer per RE ($\rho_{PTRS}$)

| epre-Ratio | The number of PDSCH layers | | | | | |
|---|---|---|---|---|---|---|
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | reserved | | | | | |
| 3 | reserved | | | | | |

FIG.11C

The downlink CSI-RS EPRE can be derived from the SS/PBCH block downlink transmit power given by the parameter *ss-PBCH-BlockPower* and CSI-RS power offset given by the parameter *powerControlOffsetSS* provided by higher layers. The downlink reference-signal transmit power is defined as the linear average over the power contributions (in [W]) of the resource elements that carry the configured CSI-RS within the operating system bandwidth.

FIG.12
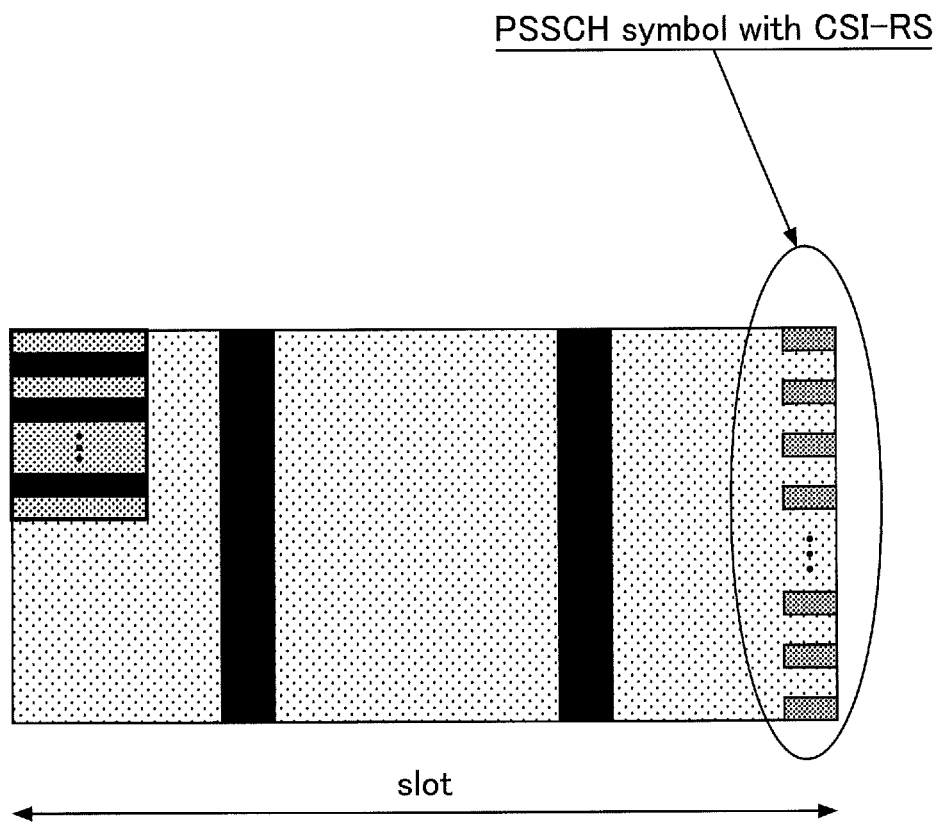
slot
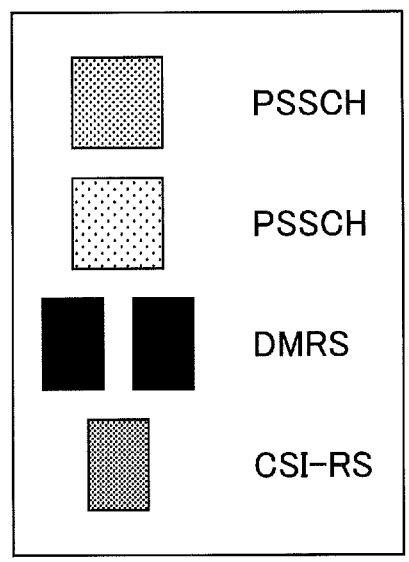

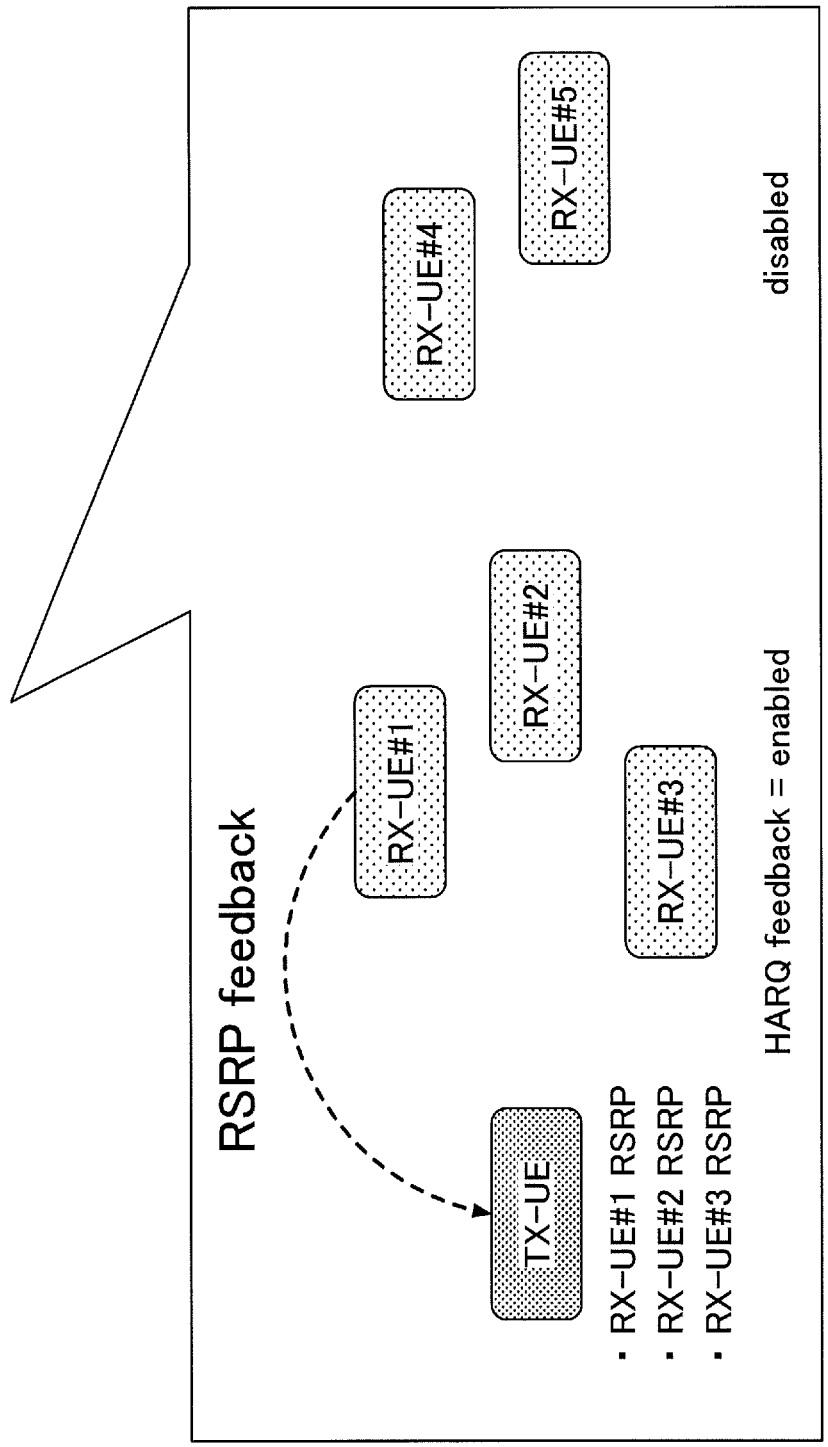

FIG.15

- $PL_{b,f,c}(q_d)$ is a downlink pathloss estimate in dB calculated by the UE using reference signal (RS) index $q_d$ for the active DL BWP, as described in Subclause 12, of serving cell $c$

- If the UE is not provided *PUSCH-PathlossReferenceRS* or before the UE is provided dedicated higher layer parameters, the UE calculates $PL_{b,f,c}(q_d)$ using a RS resource from the SS/PBCH block that the UE uses to obtain *MIB*

- If the UE is configured with a number of RS resource indexes, up to the value of *maxNrofPUSCH-PathlossReferenceRSs*, and a respective set of RS configurations for the number of RS resource indexes by *PUSCH-PathlossReferenceRS*, the set of RS resource indexes can include one or both of a set of SS/PBCH block indexes, each provided by *ssb-Index* when a value of a corresponding *pusch-PathlossReferenceRS-Id* maps to a SS/PBCH block index, and a set of CSI-RS resource indexes, each provided by *csi-RS-Index* when a value of a corresponding *pusch-PathlossReferenceRS-Id* maps to a CSI-RS resource index. The UE identifies a RS resource index $q_d$ in the set of RS resource indexes to correspond either to a SS/PBCH block index or to a CSI-RS resource index as provided by *pusch-PathlossReferenceRS-Id* in *PUSCH-PathlossReferenceRS*

- If the PUSCH transmission is scheduled by a RAR UL grant as described in Subclause 8.3, the UE uses the same RS resource index $q_d$ as for a corresponding PRACH transmission

- If the UE is provided *SRI-PUSCH-PowerControl* and more than one values of *PUSCH-PathlossReferenceRS-Id*, the UE obtains a mapping from *sri-PUSCH-PowerControlId* in *SRI-PUSCH-PowerControl* between a set of values for the SRI field in DCI format 0_1 and a set of *PUSCH-PathlossReferenceRS-Id* values. If the PUSCH transmission is scheduled by a DCI format 0_1 that includes a SRI field, the UE determines the RS resource index $q_d$ from the value of *PUSCH-PathlossReferenceRS-Id* that is mapped to the SRI field value where the RS resource is either on serving cell $c$ or, if provided, on a serving cell indicated by a value of *pathlossReferenceLinking*

- If the PUSCH transmission is scheduled by a DCI format 0_0, and if the UE is provided a spatial setting by *PUCCH-SpatialRelationInfo* for a PUCCH resource with a lowest index for active UL BWP $b$ of each carrier $f$ and serving cell $c$, as described in Subclause 9.2.2, the UE uses the same RS resource index $q_d$ as for a PUCCH transmission in the PUCCH resource with the lowest index

- If the PUSCH transmission is scheduled by a DCI format 0_0 and if the UE is not provided a spatial setting for a PUCCH transmission, or by a DCI format 0_1 that does not include a SRI field, or if *SRI-PUSCH-PowerControl* is not provided to the UE, the UE determines a RS resource index $q_d$ with a respective *PUSCH-PathlossReferenceRS-Id* value being equal to zero where the RS resource is either on serving cell $c$ or, if provided, on a serving cell indicated by a value of *pathlossReferenceLinking*

FIG.16

```
PUSCH-PathlossReferenceRS ::=        SEQUENCE {
    pusch-PathlossReferenceRS-Id         PUSCH-PathlossReferenceRS-Id,
    referenceSignal                      CHOICE {
        ssb-Index                            SSB-Index,
        csi-RS-Index                         NZP-CSI-RS-ResourceId
    }
}
```

FIG.17

TCI-state#0

| QCL type-A | RS ID#A |
| QCL type-B | RS ID#B |
| QCL type-C | RS ID#C |
| QCL type-D | RS ID#D |

TCI-state#1

| QCL type-A | RS ID#A |
| QCL type-B | RS ID#B |
| QCL type-C | RS ID#C |
| QCL type-D | RS ID#D |

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

TERMINAL, SYSTEM, AND COMMUNICATION METHOD FOR TRANSMISSION POWER CONTROL FOR A SIDELINK REFERENCE SIGNAL

TECHNICAL FIELD

The present invention relates to a terminal and a communication method in a radio communication system.

BACKGROUND ART

For Long Term Evolution (LTE) and a LTE successor system (e.g., LTE-Advanced (LTE-A), New Radio (NR) (which is also referred to as 5G)), sidelink (which is also referred to as Device to Device (D2D)) technology has been studied in which terminals, such as User Equipment (UE), directly communicate with each other without going through a base station.

In addition, implementation of Vehicle to Everything (V2X) has been studied and specifications have been developed. Here, V2X is a part of Intelligent Transport Systems (ITS) and, as illustrated in FIG. 1, V2X is a generic term for Vehicle to Vehicle (V2V), which implies a communication mode executed between vehicles; Vehicle to Infrastructure (V2I), which implies a communication mode executed between a vehicle and a rode-side unit (RSU: Road-Side Unit); Vehicle to Nomadic device (V2N), which implies a communication mode executed between a vehicle and a driver's mobile terminal; and a Vehicle to Pedestrian (V2P), which implies a communication mode executed between a vehicle and a pedestrian's mobile terminal.

RELATED ART DOCUMENT

Non-Patent Document

Non-Patent Document 1: 3GPP TS 36.213 V15.2.0 (2018-06)
Non-Patent Document 2: 3GPP TS 38.211 V15.6.0 (2019-06)
Non-Patent Document 3: 3GPP TS 38.214 V15.5.0 (2019-03)
Non-Patent Document 4: 3GPP TS 38.331 V15.5.1 (2019-04)

SUMMARY OF THE INVENTION

Problem to be Solved by the Invention

It is assumed that transmission power control (power control) is supported for New Radio (NR) sidelink (SL). For 3GPP release 16, it is assumed that only the open-loop transmitter power control, OLPC, is supported. In the open-loop transmitter power control, a terminal measures received power of a signal from a base station and determines uplink transmit power.

Currently, it is not specified how to perform transmission power control for a sidelink Channel State Information Reference Signal (CSI-RS) in NR sidelink communication. Furthermore, currently, it is not specified how to perform transmission power control for a sidelink Phase Tracking Reference Signal (PTRS) in NR sidelink communication. There is a need for enabling to execute transmission power control for these sidelink reference signals appropriately.

Means for Solving the Problem

According to an aspect of the present invention, there is provided a terminal including a control unit that sets, when data transmitted on a sidelink shared channel is frequency division multiplexed with a sidelink reference signal in a symbol to which the sidelink shared channel is mapped, a first value of a transmit power for transmitting the reference signal to a same value as or a different value from a second value of a transmit power for transmitting the data; and a transmitting unit that transmits the reference signal and the data, wherein the transmitting unit applies the first value of the transmit power to the reference signal and applies the second value of the transmit power to the data.

Advantage of the Invention

According to an embodiment, transmission power control for a sidelink reference signal can be appropriately performed.

BRIEF DESCRIPTION OF DRAWINGS

FIG. 8B is a diagram illustrating an outline of SL transmission mode 2a.
FIG. 10 is a diagram illustrating an example of a formula used for transmission power control in LTE sidelink.
FIG. 11A is a diagram illustrating an example of a specification for boosting transmit power of a reference signal in NR-Uu.
FIG. 11B is a diagram illustrating an example of a specification for boosting transmit power of a reference signal in NR-Uu.
FIG. 11C is a diagram illustrating an example of a specification for boosting transmit power of a reference signal in NR-Uu.
FIG. 12 is a diagram illustrating an example of a slot configuration including PSCCH symbols with a CSI-RS.
FIG. 14 is a diagram illustrating an example of applying open-loop transmission power control based on a sidelink pathloss when a distance-based HARQ is applied.

FIG. 15 is a diagram illustrating an example of specifying measurement of a pathloss with a reference signal based on PUSCH-PathlossReferenceRS.

FIG. 16 is a diagram illustrating an example of α PUSCH-PathlossReferenceRS information element.

FIG. 17 is a diagram illustrating an example of correspondence between a TCI state and a reference signal.

EMBODIMENTS OF THE INVENTION

In the following, embodiments of the present invention (the embodiments) are described with reference to the drawings. The embodiments described below are merely examples, and the embodiments to which the present invention is applied are not limited to the following embodiments.

A method of direct communication between terminals according to the present embodiment is assumed to be LTE or NR sidelink (SL (Sidelink)), but the method of direct communication is not limited to this method. Additionally, the name "sidelink" is an example and Uplink (UL) may include a function of SL without using the name "sidelink." SL may be distinguished from Downlink (DL) or UL by a difference in frequency or time resource and SL may have another name.

UL and SL may also be distinguished by a difference in one or more combinations of time resources, frequency resources, time and frequency resources, reference signals referenced to determine a Pathloss in transmission power control, and reference signals used to synchronize (PSS/SSS/PSSS/SSSSS).

For example, for UL, a reference signal of an antenna port X_ANT is used as a reference signal to be referenced to determine a Pathloss in transmission power control, and for SL (including UL used as SL), a reference signal of antenna port Y_ANT is used as a reference signal to be referenced to determine a Pathloss in transmission power control.

In this embodiment, it is mainly assumed that a terminal (which may be referred to as user equipment (UE)) is installed in a vehicle, but embodiments of the present invention are not limited to this embodiment. For example, a terminal may be a terminal carried by a person, a terminal may be a device installed in a drone or an aircraft, or a terminal may be a base station, an RSU, a relay station (relay node), user equipment having a scheduling capability, or the like.

(Outline of Sidelink)

In this embodiment, the sidelink is used as basic technology. Accordingly, as a basic example, an outline of sidelink is described. Examples of the techniques described herein are those specified in 3GPP Rel.14, or the like. The technique may be used in NR, or a different technique may be used in NR. Here, sidelink communication may be defined as direct communication performed between two or more adjacent user devices using E-UTRA technology without going through a network node. Sidelink may be defined as an interface between user devices in sidelink communication.

Figure 1:
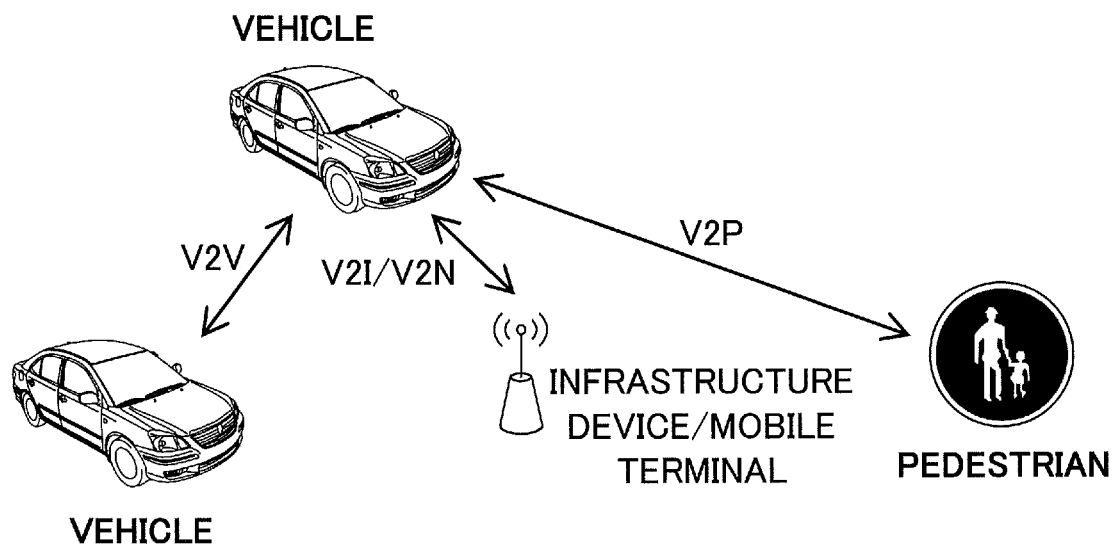
FIG. 1 is a diagram illustrating V2X.
Figure 2A:
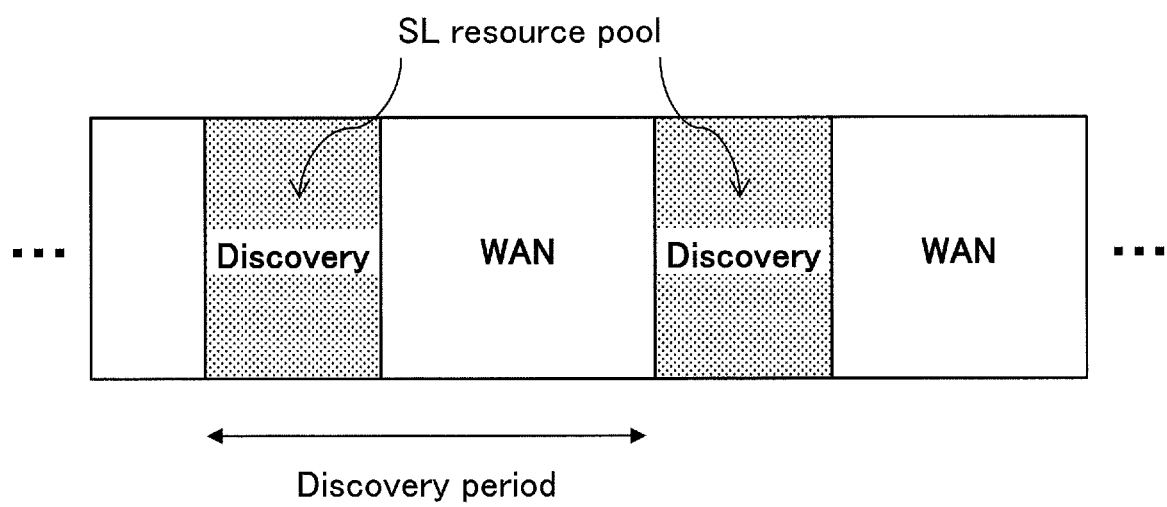
FIG. 2A is a diagram illustrating sidelink.

When the sidelink is broadly divided, the sidelink includes "discovery" and "communication." For "discovery," as illustrated in FIG. 2A, a resource pool for a Discovery message is configured for each Discovery period, and a terminal (called UE) transmits a Discovery message (discovery signal) within that resource pool. More specifically, Type 1 and Type 2b are available. In Type 1, a terminal may autonomously select a transmitting resource from the resource pool. In Type 2b, quasi-static resources may be allocated by higher-layer signaling (e.g., RRC signals) (instead of the higher layer signaling, PC5-RRC, which is sidelink RRC signaling, may be applied, or DCI and/or SCI may be applied).

Figure 2B:
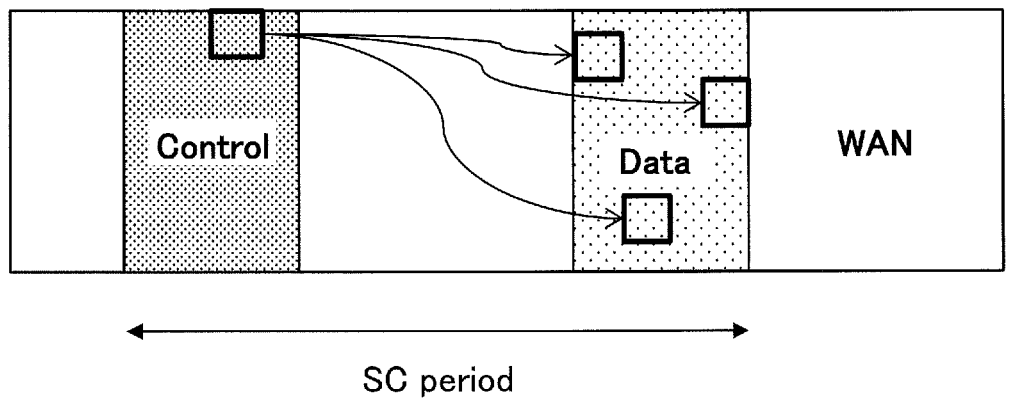
FIG. 2B is a diagram illustrating sidelink.

As illustrated in FIG. 2B, for "communication," a resource pool for Sidelink Control Information (SCI)/data transmission is periodically configured for each Sidelink Control (SC) period. A transmitting terminal signals a data transmission resource (PSSCH resource pool), or the like to a receiving side by SCI with a resource selected from a Control resource pool (PSSCH resource pool) and transmits the data using the data transmission resource. For Communication, more specifically, there are modes 1 and 2. In mode 1, resources may be dynamically assigned by (Enhanced) Physical Downlink Control Channel ((E) PDCCH) transmitted from a base station to a terminal. In mode 2, a terminal may autonomously select a transmission resource from the resource pool. As the resource pool, a predefine pool may be used, such as that signaled by SIB (instead of SIB, MIB, higher layer signaling, PC5-RRC that is the sidelink RRC signaling, or the like may be applied).

Furthermore, Rel-14 includes, in addition to mode 1 and mode 2, mode 3 and mode 4. In Rel-14, SCI and data can be simultaneously (in one subframe) transmitted in adjacent resource blocks in a frequency direction. Here, the SCI may be referred to as scheduling assignment (SA).

A channel used for "discovery" is referred to as Physical Sidelink Discovery Channel (PSDCH), a channel used for transmitting control information, such as SCI in "communication," is referred to as Physical Sidelink Control Channel (PSCCH), and a channel for transmitting data may be referred to as Physical Sidelink Shared Channel (PSSCH). PSCCH and PSSCH may have a structure based on PUSCH, and Demodulation Reference Signal (DMRS) may be inserted in the structure. Note that, in the specification, PSCCH may be referred to as a sidelink control channel, and the PSSCH may be referred to as a sidelink shared channel. A signal transmitted on PSCCH may be referred to as a sidelink control signal, and a signal transmitted on PSSCH may be referred to as a sidelink data signal.

Figure 3:
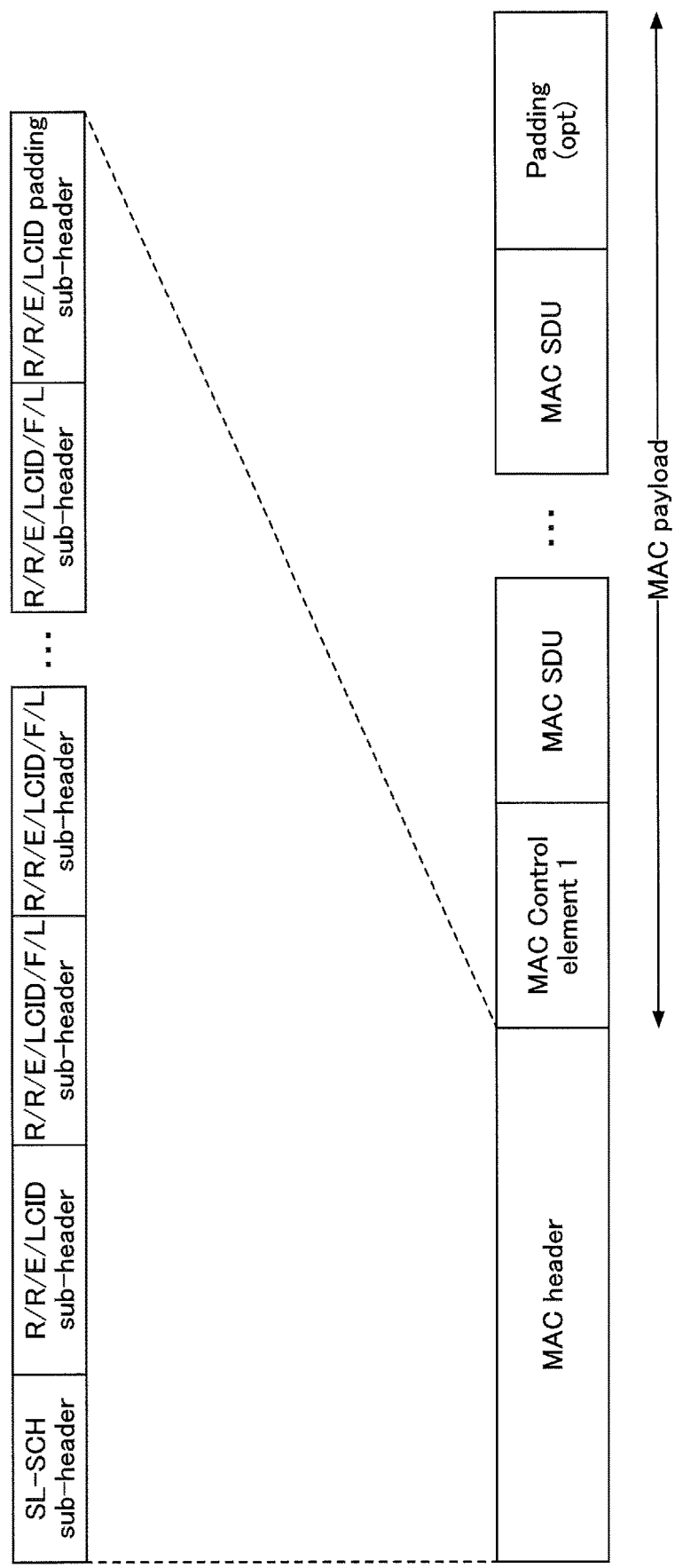
FIG. 3 is a diagram illustrating a MAC PDU used for sidelink communication.

A Medium Access Control (MAC) Protocol Data Unit (PDU) used for sidelink may include at least a MAC header, MAC Control element, MAC Service Data Unit (SDU), and padding, as illustrated in FIG. 3. The MAC PDU may include any other information. A MAC header may include one Sidelink Shared Channel (SL-SCH) subheader and one or more MAC PDU subheaders.

Figure 4:
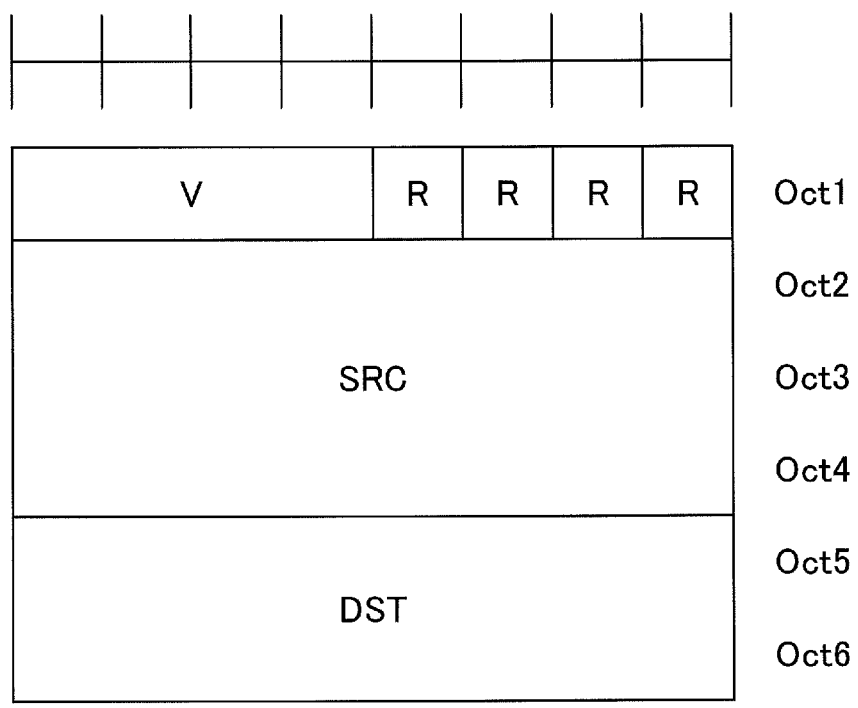
FIG. 4 is a diagram illustrating an SL-SCH subheader format.

As illustrated in FIG. 4, a SL-SCH subheader may include a MAC PDU format version (V), source information (SRC), destination information (DST), Reserved bit (R), or the like. V is assigned to a start of the SL-SCH subheader and V may indicate a MAC PDU format version used by a terminal. In the source information, information on a transmission source may be configured. In the transmission source information, an identifier of a ProSe UE ID may be configured.

In the destination information, information on a transmission destination may be configured. Transmission destination information may be configured with information on a ProSe Layer-2 Group ID of the destination.

Figure 5:
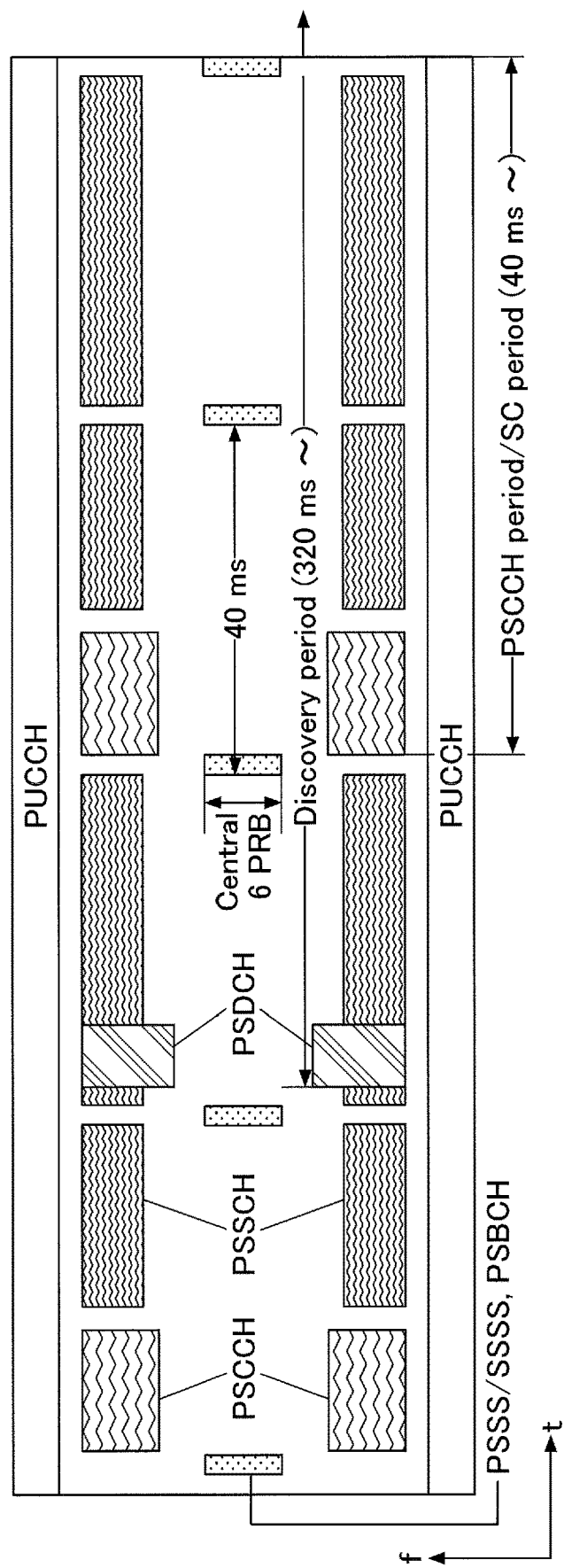
FIG. 5 is a diagram illustrating an example of a channel structure used for LTE-V2X sidelink.

An example of a side-link channel structure in LTE-V2X is illustrated in FIG. 5. As illustrated in FIG. 5, a PSCCH resource pool and a PSSCH resource pool used for "communication" may be assigned. The PSDCH resource pool used for "discovery" is assigned with a period longer than a channel period of "communication." In NR-V2X, PSDCH need not be included.

Furthermore, Primary Sidelink Synchronization signal (PSSS) and Secondary Sidelink Synchronization signal (SSSS) may be used as synchronization signals for sidelink. For example, for an out-of-coverage operation, Physical Sidelink Broadcast Channel (PSBCH) may be used, which is for transmitting broadcast information, such as a sidelink system bandwidth, a frame number, resource configuration information. PSSS/SSSS and PSBCH are transmitted, for example, in a single subframe.

PSSS/SSSS may be referred to as SLSS.

The V2X assumed in the embodiments is a scheme related to "communication." However, in the embodiments, there may be no distinction between "communication" and "discovery." Furthermore, the techniques according to the embodiments may be applied to "discovery."

(System Configuration)

Figure 6:
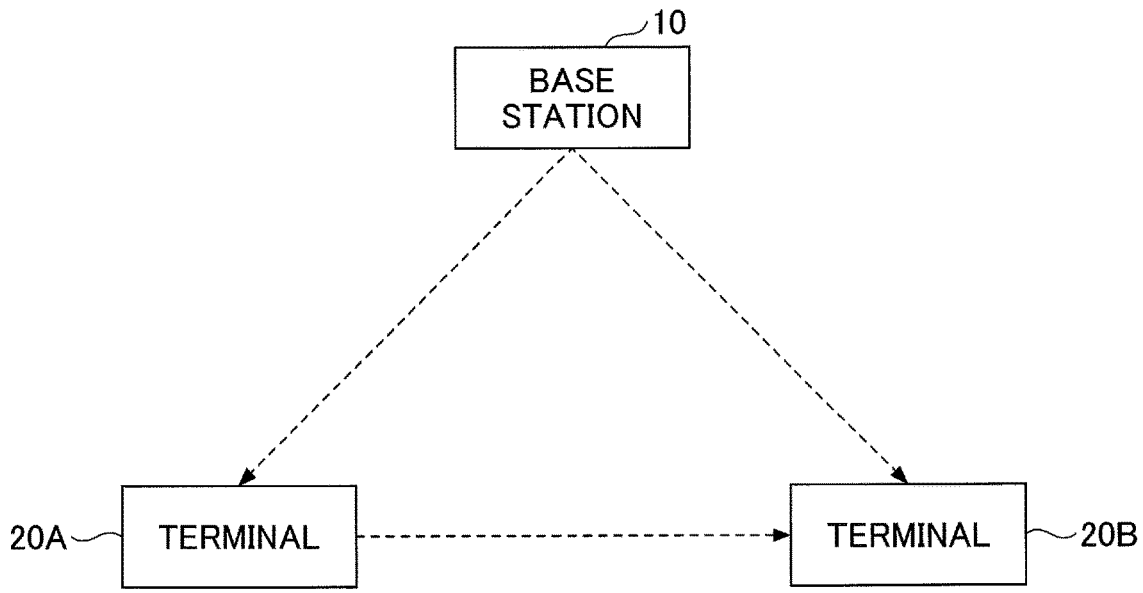
FIG. 6 is a diagram illustrating an example of a configuration of a radio communication system according to an embodiment.

FIG. 6 is a diagram illustrating an example of a configuration of a radio communication system according to an embodiment. As illustrated in FIG. 6, a radio communication system according to the embodiment includes a base station 10, a terminal 20A, and a terminal 20B. Note that, in practice, there may be a large number of terminals, but FIG. 6 illustrates the terminal 20A and the terminal 20B as an example.

In FIG. 6, the terminal 20A is intended to be the transmitting side and the terminal 20B is intended to be the receiving side. However, each of the terminal 20A and the terminal 20B is provided with both transmission function and reception function. In the following, when the terminals 20A, 20B, or the like are not particularly distinguished, it is simply described as the terminal 20 or the terminal. In FIG. 6, for example, a case is indicated in which both the terminal 20A and the terminal 20B are within the coverage. However, the operation according to this embodiment can be applied to a case in which all the terminals 20 are within the coverage; a case in which some of the terminals 20 are within the coverage and other terminals 20 are outside the coverage; and a case in which all the terminals 20 are outside the coverage.

In this embodiment, the terminal 20 is, for example, a device installed in a vehicle such as an automobile and has a function of cellular communication as user equipment (UE) in the LTE or NR and a side link function. Additionally, the terminal 20 includes functions, such as a GPS device, a camera, various types of sensors, for obtaining report information (location, event information, etc.). The terminal 20 may be a typical mobile terminal (such as a smartphone). The terminal 20 may be an RSU. The RSU may be a UE-type RSU with UE functions, a BS-type RSU with base station functions (also referred to as gNB-type UE), or a relay station.

The terminal 20 need not be a single housing device. For example, even if various types of sensors are distributed in a vehicle, the device including the various types of sensors is the terminal 20. The terminal 20 need not include various types of sensors, and the terminal 20 may include a function for transmitting data to and receiving data from the various types of sensors.

The details of processing of sidelink transmission by the terminal 20 are basically the same as the details of processing of UL transmission in the LTE or NR. For example, the terminal 20 scrambles a code word of transmission data, modulates to generate complex-valued symbols, and maps the complex-valued symbols to one or two layers for precoding. The precoded complex-valued symbols are then mapped to a resource element to generate a transmission signal (e.g., CP-OFDM, DFT-s-OFDM) and the transmission signal is transmitted from each antenna port.

The base station 10 has a function of cellular communication as the base station 10 in LTE or NR, and the base station 10 has a function for enabling communication of the terminal 20 according to the embodiments (e.g., resource pool configuration or resource allocation). The base station 10 may be an RSU (gNB-type RSU), a relay station, or a terminal having a scheduling function.

In the radio communication system according to the embodiments, a signal waveform used by the terminal 20 for SL or UL may be OFDMA, SC-FDMA, or other signal waveforms. In the radio communication system according to the embodiments, as an example, a frame including a plurality of subframes (e.g., 10 subframes) is formed in the time direction, and the frequency direction is formed of a plurality of subcarriers. One subframe is an example of one transmission Time Interval (TTI). However, TTIs are not necessarily subframes. For example, a TTI may be in units of slots or mini-slots or other time domain units. In addition, the number of slots per subframe may be determined in accordance with the subcarrier spacing. The number of symbols per slot may be 14. In addition, one symbol may include a Cyclic Prefix (CP) which is a guard period to reduce inter-symbol interference caused by multipath.

In this embodiment, the terminal 20 may take any of the following modes: a mode 1 in which resources are dynamically allocated by (Enhanced) Physical Downlink Control Channel ((E) PDCCH) transmitted from the base station 10 to the terminal; a mode 2 in which the terminal autonomously selects transmission resources from the resource pool; a mode (which is referred to as mode 3, hereinafter) in which resources for SL signal transmission are allocated from the base station 10; and a mode (which is referred to as mode 4, hereinafter) in which resources for SL signal transmission are autonomously selected. The mode is configured, for example, by higher layer signaling from the base station 10 to the terminal 20 (e.g., signaling of parameters such as scheduled or ue-selected).

Figure 7:
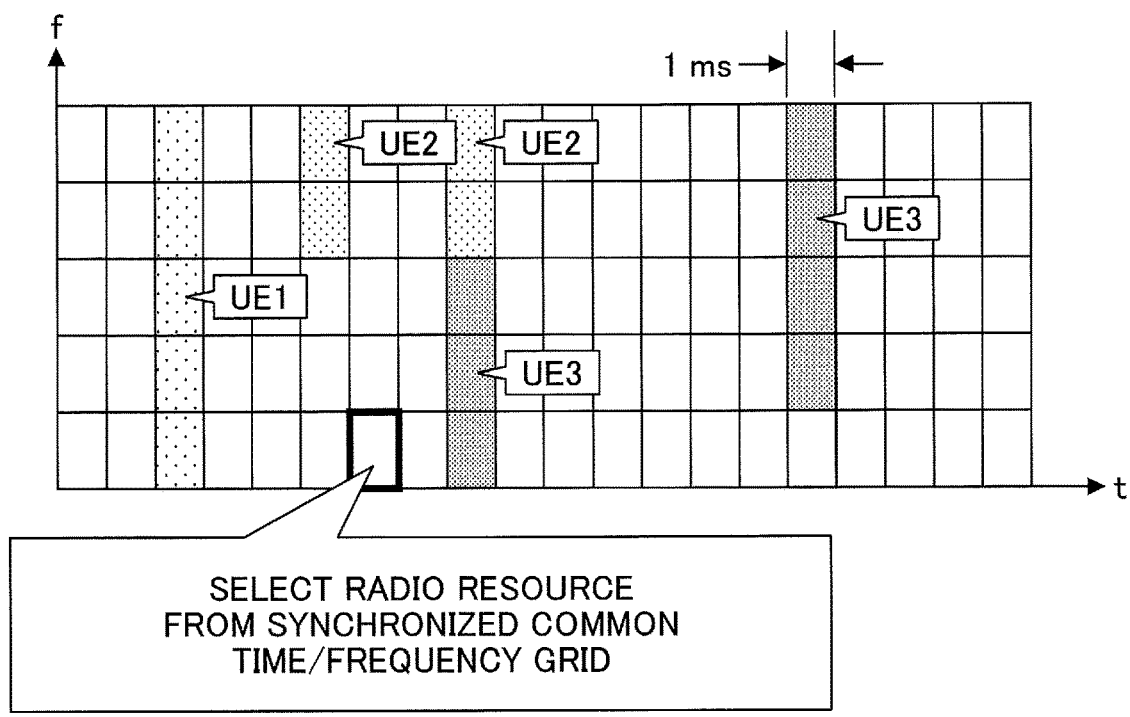
FIG. 7 is a diagram illustrating a resource selection operation of a terminal.

As illustrated in FIG. 7, the terminal of mode 4 (indicated as UE in FIG. 7) selects radio resources from a synchronized common time and frequency grid (or time and frequency domain). For example, the terminal 20 senses in the background to identify, as candidate resources, resources with good sensing results that are not reserved by the other terminal and selects, from the candidate resources, the resource to be used for transmission.

(Overview of NR V2X)

In NR V2X, transmission modes are specified that are the same as SL transmission mode 3 and SL transmission mode 4 specified in LTE V2X. Note that a transmission mode may be replaced with a resource allocation mode, and the name is not limited to this.

In the following, an outline of transmission modes defined by NR V2X is described with reference to FIGS. 8A to 8D.

Figure 8A:
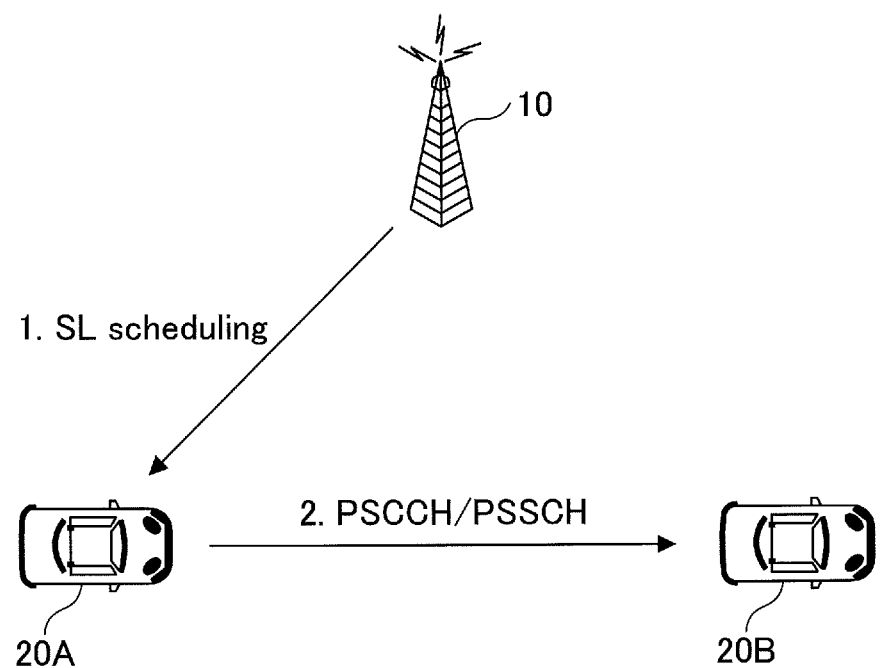
FIG. 8A is a diagram illustrating an outline of SL transmission mode 1 specified in NR V2X.

FIG. 8A is a diagram illustrating an overview of SL transmission mode 1 specified in NR V2X. SL transmission mode 1 specified in NR V2X corresponds to SL transmission mode 3 specified in LTE V2X. In the SL transmission mode 1 specified in NR V2X, the base station 10 schedules a transmission resource and allocates the transmission resource to the transmitting terminal 20A. The terminal 20A transmits a signal to the receiving terminal 20B with the assigned transmission resource.

Figure 8B:
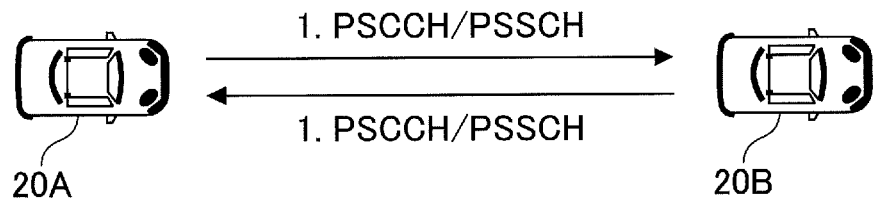
Figure 8C:
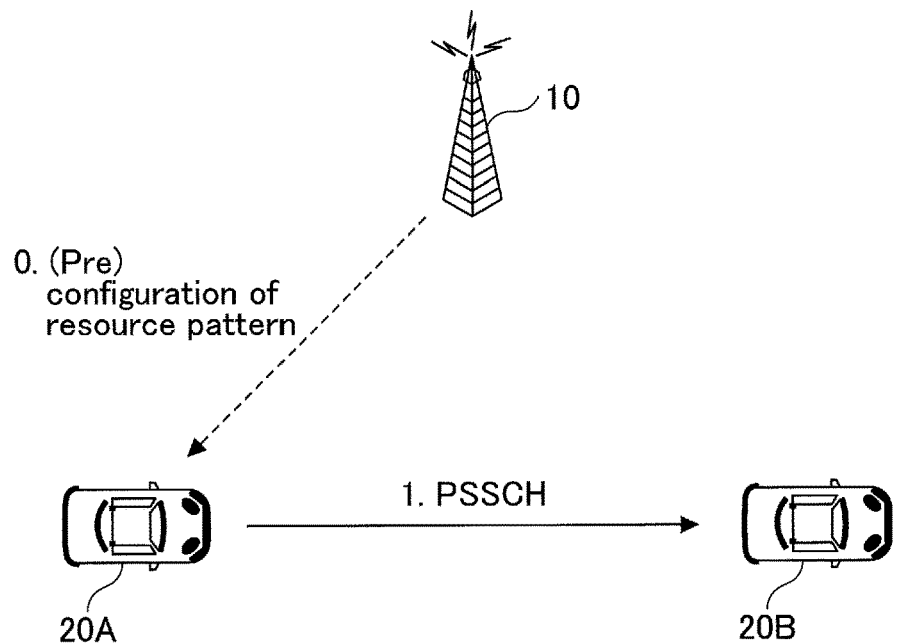
FIG. 8C is a diagram illustrating an outline of SL transmission mode 2c.
Figure 8D:
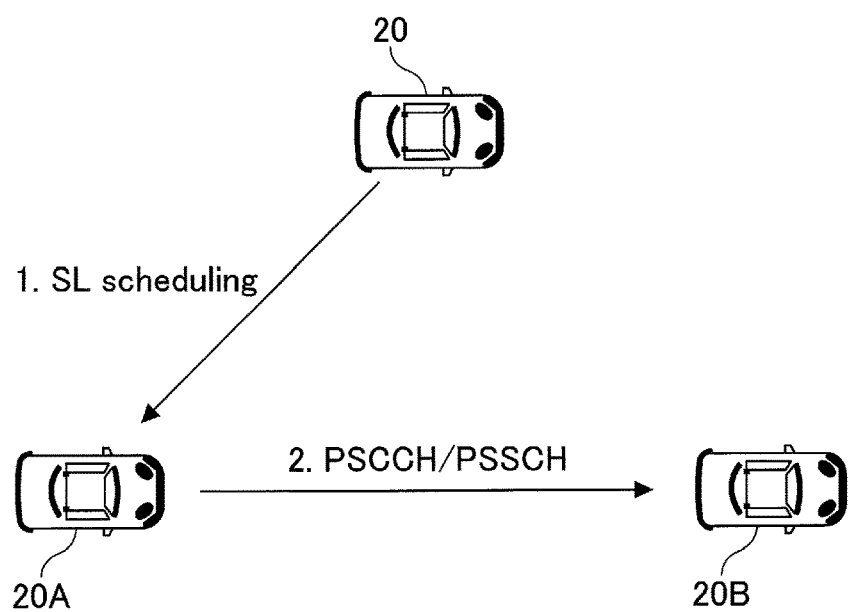
FIG. 8D is a diagram illustrating an outline of SL transmission mode 2d.

FIGS. 8B, 8C and 8D are diagrams illustrating an overview of SL transmission mode 2 as specified in NR V2X. SL transmission mode 2 specified in NR V2X corresponds to SL transmission mode 4 specified in LTE V2X.

FIG. 8B is a diagram illustrating an overview of SL transmission mode 2a. In SL transmission mode 2a, for example, the transmitting terminal 20A autonomously selects a transmission resource and transmits a signal to the receiving terminal 20B with the selected transmission resource.

FIG. 8C is a diagram illustrating an outline of SL transmission mode 2c. In the SL transmission mode 2c, for example, the base station 10 preconfigures transmitting resources with a certain period/pattern to the terminal 20A (e.g., by a higher layer parameter), and the terminal 20A transmits the signal to the receiving terminal 20B by the transmitting resources with the predetermined period/pattern. Here, instead of the base station 10 preconfiguring the transmitting resources with the certain period/pattern to the terminal 20A, for example, the transmitting resources with the certain period/pattern may be configured to the terminal 20A according to a specification.

FIG. 8D is a diagram illustrating an overview of SL transmission mode 2d. In SL transmission mode 2d, for example, the terminal 20 performs an operation that is the same as an operation of the base station 10. Specifically, the terminal 20 schedules transmission resources and assigns the transmission resources to the transmitting terminal 20A. The terminal 20A may transmit to the receiving terminal 20B with the assigned communication resources. That is, the terminal 20 may control the transmission of other terminals 20 (e.g., the terminal 20A and/or the terminal 20B).

Figure 9A:
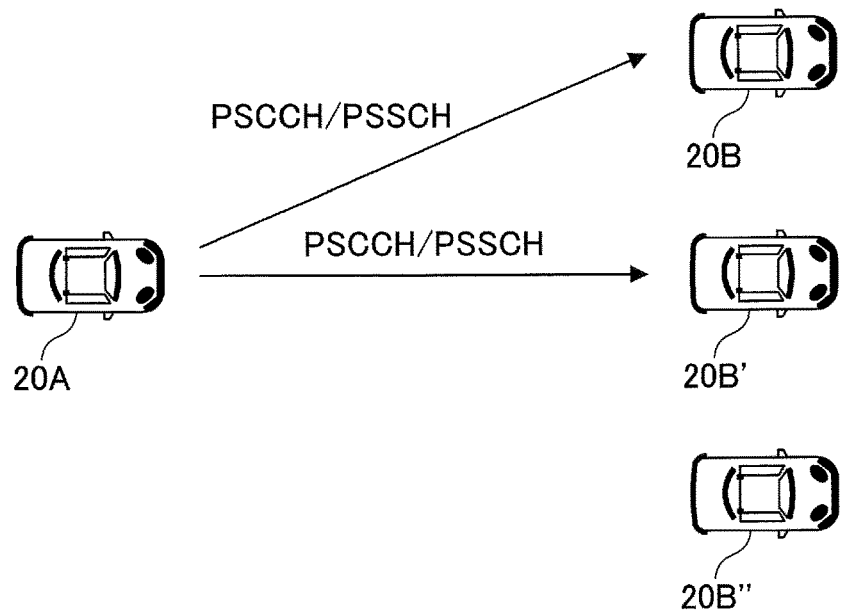
FIG. 9A is a diagram illustrating an example of unicast PSCCH/PSSCH transmission.
Figure 9B:
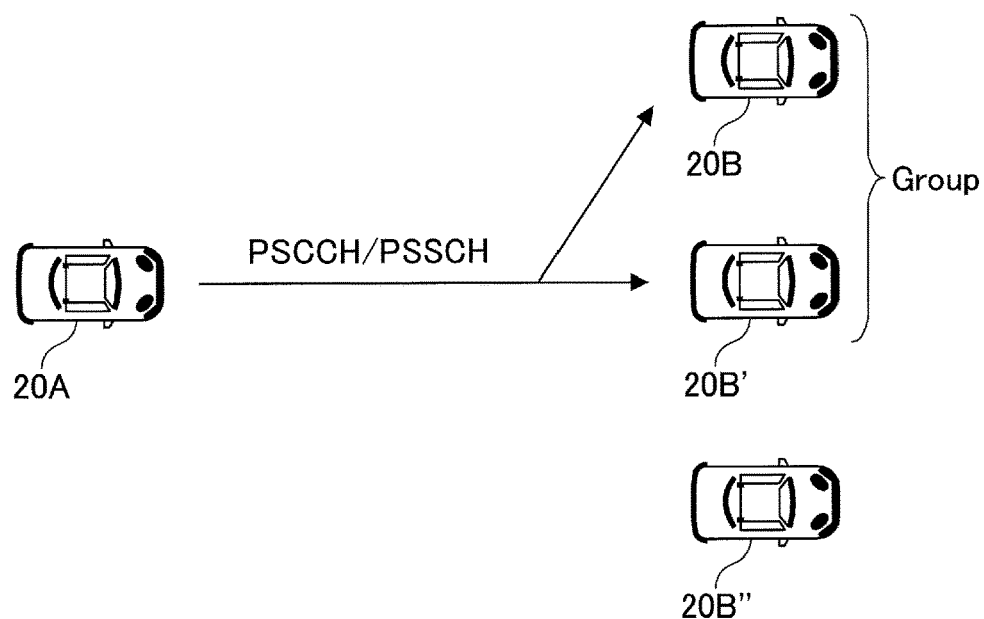
FIG. 9B is a diagram illustrating an example of groupcast PSCCH/PSSCH transmission.
Figure 9C:
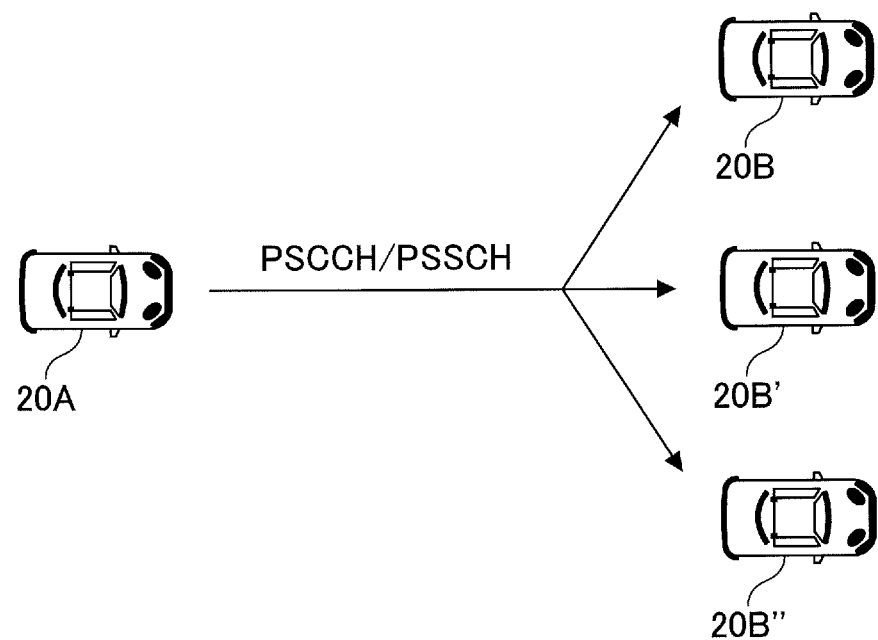
FIG. 9C is a diagram illustrating an example of broadcast PSCCH/PSSCH transmission.

In the NR, as illustrated in FIG. 9A through FIG. 9C, three communication types, which are unicast, groupcast, and broadcast, are currently studied, as types of communication.

FIG. 9A is a diagram illustrating an example of unicast Physical Sidelink Shared Channel (PSCCH)/Physical Sidelink Control Channel (PSSCH) transmission. Unicast refers, for example, to a one-to-one transmission from the transmitting terminal 20A to the receiving terminal 20B.

FIG. 9B is a diagram illustrating an example of groupcast PSCCH/PSSCH transmission. A groupcast, for example, refers to a transmission from the transmitting terminal 20A to the terminal 20B and the receiving terminal 20B', which are a group of the receiving terminals 20.

FIG. 9C is a diagram illustrating an example of broadcast PSCCH/PSSCH transmission. Broadcast refers, for example, to a transmission from the transmitting terminal 20A to the terminal 20B, the terminal 20B', and the terminal 20B" which are all the receiving terminals 20 within a predetermined range.

It is assumed that New Radio (NR) sidelink (SL) supports transmit power control (power control).

3GPP release 16 is assumed to support open-loop transmitter power control (OLPC). In open-loop transmission power control, the terminal 20 measures received power of a signal from the base station and determines uplink transmit power. In the LTE side-link communication open-loop transmission power control, a propagation loss (pathloss) of the downlink (DL) is used. In NR sidelink communication, unicast and groupcast are introduced, and it is relatively easy to measure a sidelink pathloss. Accordingly, it is assumed that the open-loop transmission power control for the NR sidelink communication uses a downlink pathloss and/or a sidelink pathloss.

In NR sidelink unicast communication, the receiving terminal 20 transmits sidelink Reference Signal Received Power (SL-RSRP) to the transmitting terminal 20. For open-loop transmission power control in the NR sidelink unicast communication, the transmitting terminal 20 estimates (which may be measure, calculate, derive, or the like) a pathloss. It is expected that it will be studied how to estimate a pathloss for open-loop transmission power control, prior to SL-RSRP becoming available to the receiving terminal 20.

In the closed-loop transmitter power control, the base station 10 measures the received power and specifies the transmit power of the terminal 20. However, it is not assumed that, in Release 16 sidelink, closed-loop transmission power control is adopted, i.e., a Transmission Power Control (TPC) command is supported in the sidelink transmission power control. However, for future NR sidelink, closed-loop transmission power control may be adopted, and the present disclosure may be applied to cases in which closed-loop transmission power control is used.

With regard to the NR sidelink open loop transmission power control, it is assumed that it is possible to configure the terminal 20 to use only a downlink (DL: between the transmitting terminal 20 and the base station 10 (gNB)) pathloss; to configure the terminal 20 to use only a sidelink (SL: between the transmitting terminal 20 and the receiving terminal 20) pathloss; and to configure the terminal 20 to use a downlink pathloss and a sidelink pathloss. In the NR sidelink open-loop transmission power control, when the terminal 20 is configured to use a downlink pathloss and a sidelink pathloss, it is assumed that a minimum power value is adopted between a power value derived by open-loop transmission power control based on the downlink pathloss and a power value derived by open-loop transmission power control based on the sidelink pathloss. Furthermore, it is assumed that the value of $P_0$ and the value of $\alpha$ used for the open-loop transmission power are separately configured for the downlink pathloss and the sidelink pathloss.

FIG. 10 is a diagram illustrating an example of a formula used for transmission power control in the LTE sidelink. According to the formula illustrated in FIG. 10, the transmit power is distributed between Physical Sidelink Shared Channel (PSSCH) and Physical Sidelink Control Channel (PSCCH). According to the formula illustrated in FIG. 10, the transmit power allocated for PSCCH is higher than the transmit power allocated for PSSCH.

(Problem A)

At present, it is not specified how to control the transmit power of a sidelink Channel State Information Reference Signal (CSI-RS) in NR sidelink communication. Furthermore, at present, it is not specified how to perform transmission power control of a sidelink Phase Tracking Reference Signal (PTRS) in the NR sidelink communication. For example, at present, it is not specified whether to apply Power-boosting to the sidelink CSI-RS and whether to apply power-booting to the sidelink PTRS. Note that, in the following, CSI-RS may imply sidelink SCI-RS (SL-CSI-RS). Similarly, PT-RS may imply sidelink PT-RS (SL-PT-RS). Each name is not limited thereto, and the SL-CSI-RS may be the RS used for the side-link CSI measurement, or the like. Similarly, SL-PT-RS may be an RS used for sidelink phase compensation.

FIGS. 11A, 11B, and 11C are diagrams illustrating examples of specifications for boosting the transmit power of a reference signal in NR-Uu (an interface between a 5G terminal 20 and Radio Access Network (RAN)) with respect to the transmit power allocated to PDSCH or PUSCH.

FIG. 11A is a diagram illustrating an example of a specification for boosting an uplink PTRS in NR-Uu. According to the example illustrated in FIG. 11, phase-tracking reference signal (PT-RS) is transmitted only in the resource block used for PUSCH.

The PT-RS is mapped to a resource element (k, 1) by the expression:

[Expression 1]

$$\begin{bmatrix} a_{k,l}^{(p_0,\mu)} \\ \vdots \\ a_{k,l}^{(p_{\rho-1},\mu)} \end{bmatrix} = \beta_{PT-RS} W \begin{bmatrix} r^{(\tilde{p}_0)}(2n+k') \\ \vdots \\ r^{(\tilde{p}_{\nu-1})}(2n+k') \end{bmatrix} \quad \text{(Formula 1)}$$

Here, W is a precoding matrix, and $\beta_{PTR_s}$ is an amplitude scaling factor. In the example illustrated in FIG. 11A, the amplitude scaling factor $\beta_{PTRS}$ is applied to the PTRS, and the transmit power for the PTRS is boosted compared to the transmit power allocated to PUSCH. Note that, in the example illustrated in FIG. 11A, k' and Δ may be signaled by a higher layer parameter.

FIG. 11B is a diagram illustrating an example of a specification for boosting a downlink PTRS in NR-Uu. Table 4.1.2 indicated in the example of FIG. 11B specifies that $\beta_{PTRS}$ that is an amplitude scaling factor is defined based on a ratio ($\rho_{PTRS}$) of PT-RS Energy per Resource Element (EPRE) to EPRE of Physical Downlink Shared Channel (PDSCH) per layer per resource element. In Table 4.1.2, if the upper layer parameter epre-Ratio is zero and the number of layers for PDSCH is greater than 1, the value of $\beta_{PTRS}$ becomes greater than 1 and the transmit power of the PTRS is boosted (increased) to the transmit power assigned to the PDSCH.

FIG. 11C is a diagram illustrating an example of a specification for boosting CSI-RS in NR-Uu. In the example of FIG. 11C, it is specified that the EPRE of the downlink CSI-RS is derived by the downstream transmit power of the Synchronization Signal and Physical Broadcast Channel (SS/PBCH) block provided by the parameter ss-PBCH-BlockPower and the power offset of the CSI-RS provided by the parameter powerControlOffsetSS. Namely, the transmit power of the CSI-RS may be boosted to the transmit power of the SS/PBCH block.

(Proposal A)
(Option A1)

The terminal 20 may be able to set the value of the transmit power of the CSI-RS associated with the PSSCH to a value different from the value of the transmit power allocated to the PSSCH. The terminal 20 may also be able to set the value of the transmit power of the PT-RS associated with the PSSCH to a value different from the value of the transmit power allocated to the PSSCH.

(A1-1)

A function for determining (which may be calculating, deriving, or the like) transmit power of CSI-RS may be a function of a value of transmit power allocated to PSSCH, as a variable. Similarly, a function for calculating transmit power of PT-RS may be a function of a value of transmit power allocated to PSSCH, as a variable. For example, transmit power of CSI-RS may be calculated using a ratio with respect to a value of transmit power allocated to PSSCH. Similarly, transmit power of PT-RS may be calculated using a ratio with respect to transmit power allocated to PSSCH.

FIG. 12 is a diagram illustrating an example of a slot configuration including a PSCCH symbol with a CSI-RS. In this case, for example, transmit power $P_{CSIRS}$ for CSI-RS and transmit power $P_{PSSCH,b}$ for a PSSCH symbol with CSI-RS may be specified as follows.

[Expression 2]

$$P_{CSIRS} = 10\log_{10}\left(\frac{10^{\frac{\alpha}{10}} \times N_{CSIRS}}{N_{PSSCH} + 10^{\frac{\alpha}{10}} \times N_{CSIRS}}\right) + P_{PSSCH,a} \quad \text{(Formula 2)}$$

$$P_{PSSCH,b} = 10\log_{10}\left(\frac{N_{PSSCH}}{N_{PSSCH} + 10^{\frac{\alpha}{10}} \times N_{CSIRS}}\right) + P_{PSSCH,a} \quad \text{(Formula 3)}$$

Here, α may be a value defined in a specification (e.g., a fixed value or variable), a (pre) configured parameter, or a specified parameter. The $P_{PSSCH,a}$ may be the transmit power of a PSCCH symbol without PSCCH and CSI-RS, or transmit power of each of a PSCCH symbol and/or a PSSCH symbol. The $N_{CSIRS}$ may be a value based on an amount of CSI-RS resources, for example, a number of CSI-RS resource elements (REs) included in a symbol in a Physical Resource Block (PRB). The $N_{PSSCH}$ may be a value based on an amount of PSSCH resources, for example, a number of PSSCH REs included in a symbol in the PRB.

The total transmit power allocated to each symbol in an interval of one slot illustrated in FIG. 12 may be maintained at a constant value. In this case, it is assumed that the terminal 20 operates such that, for a symbol in which CSI-RS and PSCCH are multiplexed in a frequency domain, transmit power allocated to the CSI-RS is boosted and power allocated to resource elements of PSCCH other than the CSI-RS is reduced. In this manner, by boosting transmit power of CSI-RS and/or PT-RS, the accuracy of the measurement of the channel state information can be enhanced.

In the above example, since power is allocated to CSI-RS, the type of CSI-RS may be NZP-CSI-RS (Non-Zero-Power CSI-RS).

As a reason to maintain the total transmit power allocated to each symbol in the interval of one slot illustrated in FIG. 12 at a constant value, it is considered that, if the power is changed during the interval of one slot, it takes time for the RF device to change the power and a problem occurs on transmission characteristics of the RF device. To avoid such a problem, the transmit power between the symbols is kept constant in one slot. For example, in FIG. 12, when the total transmit power allocated to one symbol is P in a portion where PSCCH and PSSCH are multiplexed, the total transmit power allocated to one symbol is P in the portion where the CSI-RS and PSSCH of the slot in FIG. 12 are multiplexed. Because the total transmit power allocated to one symbol is constant, when multiple channels are multiplexed in the frequency domain, the total transmit power is allocated to the multiple channels. If a particular channel is to be prioritized over a plurality of channels that are multiplexed in the frequency domain, a method can be applied in which transmit power of the particular channel is boosted over transmit power of the other channels.

The CSI-RS described above may be prohibited from overlapping with PSCCH at least in the time domain. Similarly, the CSI-RS described above may be prohibited from overlapping (Overlap) with the DM-RS associated with PSSCH at least in the time domain. This avoids the complexity of the mathematical formula relating to the power control, that is, it simplifies the configuration of the terminal.

Alternatively, the CSI-RS described above may be allowed to overlap with PSCCH (Overlap) at least in the time domain. Similarly, the CSI-RS described above may be allowed to overlap (Overlap) with the DM-RS associated with PSSCH at least in the time domain. In this case, in one symbol, the transmit power of the CSI-RS may be determined by a ratio with respect to transmit power of at least one of the DM-RS associated with the PSSCH, PSCCH, PSSCCH and/or PSCCH. The above-described formula can be modified as described below to boost a signal to be prioritized. Note that in the above example, the CSI-RS may be replaced with PT-RS.

As another example, when PSSCH, CSI-RS, and PT-RS are multiplexed in the frequency domain in one symbol, transmit power $P_{CSIRS}$ for CSI-RS, transmit power $P_{PTRS}$ for PT-RS, and transmit power $P_{PSSCH,c}$ allocated to PSSCH may be specified as follows.

[Expression 4]

$$P_{CSIRS} = 10\log_{10}\left(\frac{10^{\frac{\alpha}{10}} \times N_{CSIRS}}{N_{PSSCH} + 10^{\frac{\alpha}{10}} \times N_{CSIRS} + 10^{\frac{\beta}{10}} \times N_{PTRS}}\right) + P_{PSSCH,\alpha}$$

(Formula 4)

[Expression 5]

$$P_{PTRS} = 10\log_{10}\left(\frac{10^{\frac{\beta}{10}} \times N_{PTRS}}{N_{PSSCH} + 10^{\frac{\alpha}{10}} \times N_{CSIRS} + 10^{\frac{\beta}{10}} \times N_{PTRS}}\right) + P_{PSSCH,\alpha}$$

(Formula 5)

[Expression 6]

$$P_{PSSCH,c} = 10\log_{10}\left(\frac{N_{PSSCH}}{N_{PSSCH} + 10^{\frac{\alpha}{10}} \times N_{CSIRS} + 10^{\frac{\beta}{10}} \times N_{PTRS}}\right) + P_{PSSCH,\alpha}$$

(Formula 6)

Here, $\alpha$ may be a value defined in a specification (e.g., a fixed value or variable), a (pre) configured parameter, or a specified parameter. $\beta$ may be a parameter specified in a specification, a (pre) configured parameter, or a specified parameter. The $P_{PSSCH,a}$ may be the transmit power of a PSCCH symbol without CSI-RS and PT-RS, or transmit power of each of a PSCCH symbol and/or a PSSCH symbol. The $P_{PSSCH,c}$ may be transmit power of a PSSCH symbol with CSI-RS and PT-RS. The $N_{CSIRS}$ may be a value based on an amount of CSI-RS resources, for example, a number of CSI-RS resource elements (REs) included in a symbol in a Physical Resource Block (PRB). $N_{PTRS}$ may be a value based on a resource among of PT-RS, for example, a number of PT-RS resource elements (REs) included in a symbol in a Physical Resource Block (PRB). The $N_{PSSCH}$ may be a value based on an amount of PSSCH resources, for example, a number of PSSCH REs included in a symbol in the PRB.

As another example, when PSCCH, PSSCH, and CSI-RS are multiplexed in the frequency domain in one symbol, for example, transmit power $P_{CSIRS}$ Of CSI-RS, transmit power $P_{PSCCH}$ Of PSCCH, and transmit power $P_{PSSCH,c}$ allocated to PSSCH may be specified as follows.

[Expression 7]

$$P_{CSIRS} = 10\log_{10}\left(\frac{10^{\frac{\alpha}{10}} \times N_{CSIRS}}{N_{PSSCH} + 10^{\frac{\alpha}{10}} \times N_{CSIRS} + 10^{\frac{\beta}{10}} \times N_{PSCCH}}\right) + P_{PSSCH,\alpha}$$

(Formula 7)

[Expression 8]

$$P_{PSCCH} = 10\log_{10}\left(\frac{10^{\frac{\beta}{10}} \times N_{PSCCH}}{N_{PSSCH} + 10^{\frac{\alpha}{10}} \times N_{CSIRS} + 10^{\frac{\beta}{10}} \times N_{PSCCH}}\right) + P_{PSSCH,\alpha}$$

(Formula 8)

[Expression 9]

$$P_{PSSCH,c} = 10\log_{10}\left(\frac{N_{PSSCH}}{N_{PSSCH} + 10^{\frac{\alpha}{10}} \times N_{CSIRS} + 10^{\frac{\beta}{10}} \times N_{PSCCH}}\right) + P_{PSSCH,\alpha}$$

(Formula 9)

Here, $\alpha$ may be a value defined in a specification, a (pre) configured parameter, or a specified parameter. $\beta$ may be a parameter specified in a specification, a (pre) configured parameter, or a specified parameter. The $P_{PSSCH,a}$ may be the transmit power of a PSCCH symbol without CSI-RS and PT-RS, or transmit power of each of a PSCCH symbol and/or a PSSCH symbol. The $P_{PSSCH,c}$ may be the transmit power of a PSSCH symbol with CSI-RS and PT-RS. The $N_{CSIRS}$ may be a value based on an amount of CSI-RS resources, for example, a number of CSI-RS resource elements (REs) included in a symbol in a Physical Resource Block. The $N_{PSSCH}$ may be a value based on an amount of PSSCH resources, for example, a number of PSSCH REs included in a symbol in the PRB.

Here, for ZP-CSI-RS (Zero-Power CSI-RS), $N_{CSIRS}=0$.

(A1-2)

Whether the terminal 20 boosts the transmit power of CSI-RS and/or PT-RS and the amount of increase in the transmit power of the CSI-RS and/or the amount of increase in the transmit power of the PT-RS (e.g., the value of $\alpha$ and/or the value of $\beta$ in the formula A1-1) may be specified by a specification. For example, $\alpha=3$ and $\beta=3$. Whether the terminal 20 boosts transmit power of CSI-RS and/or PT-RS and an amount of increase in the transmit power of the CSI-RS and/or an amount of increase in the transmit power of the PT-RS (e.g., the value of $\alpha$ and/or the value of $\beta$ in the formula A1-1) may be (pre) configured, for example, by a network or configured by a PC5-RRC message transmitted from another terminal 20, which is sidelink RRC signaling. Furthermore, whether the terminal 20 boosts transmit power of CSI-RS and/or PT-RS and an amount of increase in the transmit power of the CSI-RS and/or an amount of increase in the transmit power of the PT-RS (e.g., the value of $\alpha$ and/or the value of $\beta$ in the formula A1-1) may be specified, for example, by Downlink Control Information (DCI) and/or Sidelink Control Information (SCI) for scheduling. For example, a dedicated field for transmission power control may be specified in the DCI/SCI. Other fields indicating the presence/configuration of the CSI-RS may also be specified. Furthermore, whether the terminal 20 boosts transmit power of CSI-RS and/or PT-RS, and an amount of increase in the transmit power of the CSI-RS and/or an amount of increase in the transmit power of the PT-RS (e.g., the value of $\alpha$ and/or the value of β in the formula A1-1) may depend on, for example, the configuration of the CSI-RS and/or the configuration of the PT-RS, additionally or alternatively, depend on CSI-RS resources and/or PT-RS resources. For example, when CSI-RS resources and/or PT-RS resources are small, the transmit power of the CSI-RS and/or PT-RS may be boosted, and when CSI-RS resources and/or PT-RS resources are large, the transmit power of the CSI-RS and/or PT-RS may be set to values that are the same as the value of transmit power allocated to the PSSCH. Furthermore, elements indicating whether to boost transmit power may be included in a CSI-RS configuration and/or a PT-RS configuration. Here, the information may be determined based on a higher layer parameter, or the like, and may be determined based on a combination of a higher layer parameter and DCI and/or SCI.

(A1-3)

A function for calculating transmit power of the CSI-RS may be a function that does not consider the value of transmit power allocated to PSSCH, other than maximum transmit power of the terminal 20. Similarly, the function for calculating the transmit power of the PT-RS may be a function that does not consider the value of transmit power allocated to PSSCH, other than maximum transmit power of the terminal 20. In this case, the transmit power of the CSI-RS is not calculated using a ratio with respect to a value of the transmit power assigned to PSSCH. Similarly, the transmit power of PT-RS is not calculated using a ratio with respect to a value of the transmit power assigned to PSSCH. As described above, boosting CSI-RS and/or PT-RS by applying option 1, enhances accuracy of obtaining channel state information, accuracy of RSRP measurements, and/or accuracy of compensating for phase noise.

(Option A2)

The terminal 20 may always set the transmit power of CSI-RS and/or PT-RS associated with PSSCH to be the same as the transmit power of PSSCH. That is, the total transmit power $P_{PSSCH}$ of PSSCH may include the transmit power of CSI-RS and/or the transmit power of PT-RS and may be evenly allocated among RE of PSSCH data, RE of CSI-RS, and/or RE of PT-RS. With this configuration, device implementation can be simplified and a change in a specification can be reduced.

Note that the terminal 20 may calculate transmit power for each transmission occasion i, for each resource pool, for each subchannel, or for each cast type, such as unicast, groupcast, and broadcast. For example, the transmit power may be determined based on a length of a transmit period of an transmit occasion i, a size of a resource pool, a subchannel, and/or a cast type. The transmit power may be determined on based on the above-described calculation formula without depending on a transmission period length of a transmission occasion i, a size of a resource pool, a subchannel, and/or a cast type. In the above-described embodiment, SCI-RS and/or PT-RS may be replaced with DM-RS. In the above-described embodiment, "transmit power" may be replaced by "transmit power for each RE."

(Problem B)

Open loop transmission power control may be performed for NR sidelink groupcast communication based on a sidelink pathloss.

Figure 13:
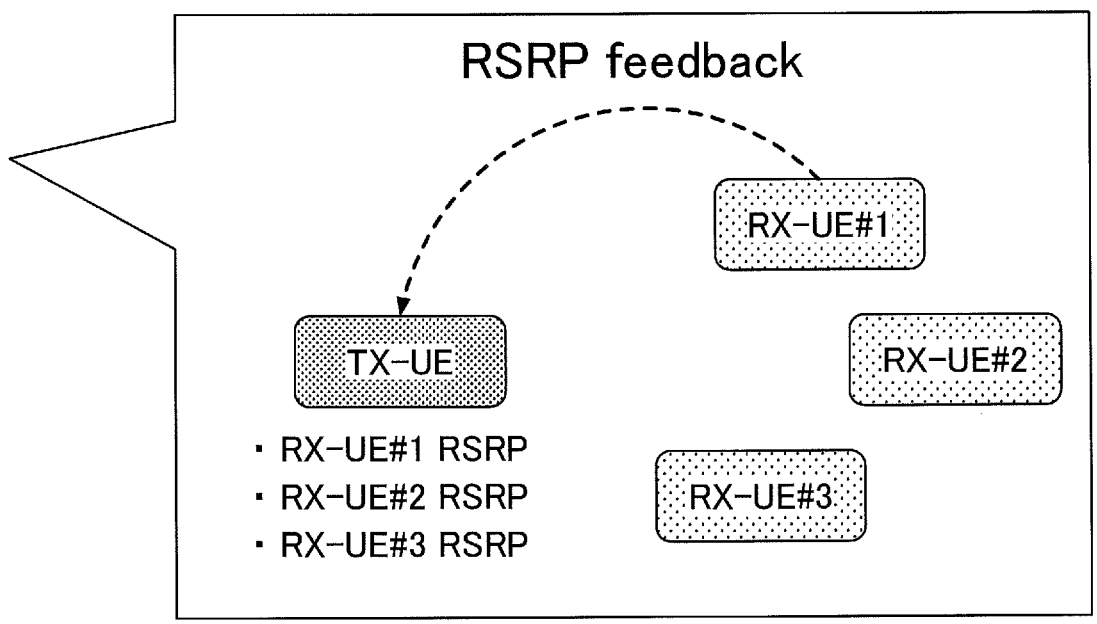
FIG. 13 is a diagram illustrating an example in which an open-loop transmission power control based on a sidelink pathloss is performed for NR sidelink groupcast communication.

FIG. 13 is a diagram illustrating an example in which open-loop transmission power control based on a sidelink pathloss is performed for NR groupcast communication. As illustrated in FIG. 13, by applying sidelink based open-loop transmission power control, for example, transmit power can be controlled so that the receiving terminal 20 farthest from the transmitting terminal 20, that is, the receiving terminal 20 having a maximum sidelink pathloss value within the group, can receive a radio signal from the transmitting terminal 20. Furthermore, since the receiving terminal 20 with the maximum sidelink pathloss value does not set the transmit power to a value greater than a value of the transmit power necessary and sufficient to receive a radio signal from the transmitting terminal 20 within the group, interference with other groups can be reduced. However, as illustrated in FIG. 13, as the number of terminals 20 in the group increases, more measurement and feedback resources are required accordingly.

(Proposal B)

Conditions may be specified to select whether to apply open loop transmission power control based on a sidelink pathloss to NR sidelink groupcast communication.

(Option B1)

In NR sidelink groupcast communication, if all RSRP of the receiving terminals 20 within the group can be used by the transmitting terminal 20, the transmitting terminal 20 may apply open-loop transmission power control based on a sidelink pathloss. When, among the receiving terminals 20 within the group, RSRP of at least one of the receiving terminal 20 is unable to be used by the transmitting terminal 20, the transmitting terminal may disable the open-loop transmission power control based on the sidelink pathloss. In this case, open-loop transmit power control based on a downlink pathloss may be applied.

RSRP of the receiving terminal 20 may be made available by receiving, by the transmitting terminal 20, RSRP fed back from the receiving terminal 20, or RSRP of the receiving terminal 20 may be made available by receiving, by the transmitting terminal 20, an RS transmitted from the receiving terminal 20 and by measuring RSRP by the transmitting terminal 20.

As described above, if RSRP of at least one of the receiving terminals 20 cannot be used by the transmitting terminal 20, the at least one of the receiving terminals 20 may be unable to receive a signal of groupcast communication. In this case, open-loop transmission power control based on a sidelink pathloss is not effective. According to the method of option B1, transmission power control can be applied only if the open-loop transmission power control based on a sidelink pathloss is effective.

(Option B2)

If Acknowledgement (ACK)/Negative-Acknowledgement (NACK) feedback of the groupcast is enabled in NR sidelink groupcast communication, the transmitting terminal 20 may apply open-loop transmission power control based on a sidelink pathloss. If the ACK/NACK feedback of the groupcast is disabled, the transmitting terminal 20 need not apply an open-loop transmission power control based on a sidelink pathloss.

Here, the Acknowledgement (ACK)/Negative-Acknowledgement (NACK) feedback of the groupcast may mean that the receiving terminal 20 sends an ACK if a transport block is successfully decoded, and the receiving terminal 20 sends a NACK if decoding of a transport block fails. That is, enabling ACK/NACK feedback of groupcast means that higher reliability is required for communication and/or the number of the terminals 20 in the group is small.

Accordingly, when ACK/NACK feedback of groupcast is enabled, it is assumed that it is desirable to increase the reliability of communication by applying open-loop transmission power control based on a sidelink pathloss. If groupcast ACK/NACK feedback is disabled, it may not be necessary to apply open-loop transmission power control based on a sidelink pathloss.

In option B2, "Acknowledgement (ACK)/Negative-Acknowledgement (NACK) feedback of groupcast may be replaced with "HARQ-ACK feedback of groupcast." The HARQ-ACK feedback of groupcast may include at least one of the following two techniques.
1. If a transport block is successfully decoded, the receiving terminal 20 transmits an ACK, and if decoding of a transport block is failed, the receiving terminal 20 transmits a NACK.
2. If a transport block is successfully decoded, the receiving terminal 20 does not transmit an ACK and NACK, and if decoding of a transport block is failed, the receiving terminal 20 transmits a NACK.

(Option B3)

In NR sidelink groupcast communication, depending on a number of terminals 20 in a group, the transmitting terminal 20 may determine whether to apply open-loop transmission power control based on a sidelink pathloss. For example, if a number of terminals 20 in a group is less than a threshold value X (or less than or equal to X), the transmitting terminal 20 may apply open-loop transmission power control based on a sidelink pathloss. If a number of terminals 20 in a group is greater than or equal to a threshold value X (or greater than X), the transmitting terminal 20 device need not apply open-loop transmission power control based on a sidelink pathloss. Here, the threshold value X may be defined by a specification, (pre) configured by a network, configured by a PC5-RRC message transmitted by another terminal 20 which is sidelink RRC, specified or determined based on a resource pool configuration, and/or specified based on a congestion level.

As described above, when a number of terminals 20 in a group is small, resources for measurement and feedback are small. In this case, it is assumed that it is effective to apply open loop transmission power control based on a sidelink pathloss.

(Option B4)

In 3GPP meeting, a distance-based HARQ function has been studied that determines whether to provide a Hybrid Automatic Repeat Request (HARQ) feedback in response to information related to a distance (e.g., distance and/or RSRP). The receiving terminal 20, which is close to the transmitting terminal 20, provides HARQ feedback. Since it is assumed that such high reliability is not required for the receiving terminal 20 which is distant from the transmitting terminal 20, the receiving terminal 20 which is distant from the transmitting terminal 20 need not provide HARQ feedback.

In NR sidelink groupcast communication, if RSRP of the receiving terminal 20 which performs HARQ feedback can be used by the transmitting terminal 20, the transmitting terminal 20 may apply open-loop transmission power control based on a sidelink pathloss. If RSRP of the receiving terminal 20 which performs HARQ feedback is not available at the transmitting terminal 20, the transmitting terminal 20 need not apply open-loop transmission power control based on a sidelink pathloss.

FIG. 14 is a diagram illustrating an example of applying open-loop transmission power control based on a sidelink pathloss when a distance-based HARQ is applied. It is assumed that high reliability of communication is required for the receiving terminal 20 for which HARQ feedback is enabled. Accordingly, by obtaining RSRP of the receiving terminal 20 for which HARQ feedback is enabled and applying the open-loop transmission power control based on the sidelink pass, the reliability of the communication can be enhanced. RSRP of the receiving terminal 20 may be enabled by receiving, by the transmitting terminal 20, RSRP fed back from the receiving terminal 20, or it may be enabled by receiving, by the transmitting terminal 20, RS transmitted from the receiving terminal 20 and measuring, by the transmitting terminal 20, RSRP. For example, in the distance-based HARQ described above, if a distance between the transmitting terminal 20 and the receiving terminal is less than (or less than or equal to) a threshold value Y, HARQ feedback may be enabled at the receiving terminal 20. Here, the threshold value Y may be specified by a specification, (pre) configured by a network, configured by a PC5-RRC message transmitted by another terminal 20, which is sidelink RRC signaling, specified based on a resource pool configuration, and/or defined based on a congestion level.

As described above, according to the method of option B4, reliability of communication with the receiving terminal 20 can be enhanced by applying open-loop transmission power control based on a sidelink pass only to the receiving side terminal 20 which is required to have high reliability for the communication.

(Option B5)

When RSRP of all the receiving terminals 20 satisfying a range requirement is available at the transmitting terminal 20 in NR sidelink groupcast communication, the transmitting terminal 20 may apply open-loop transmission power control based on a sidelink pathloss. In other cases, the transmitting terminal 20 need not apply the open-loop transmission power control based on the sidelink pathloss. RSRP of the receiving terminal may be enabled when the transmitting terminal 20 receives RSRP fed back from the receiving terminal 20, or it may be enabled when the transmitting terminal 20 receives RS transmitted from the receiving terminal 20 and measures the RSRP.

As described above, according to the method of option B5, reliability of communication with the terminal 20 can be enhanced by applying the open-loop transmission power control based on the sidelink pathloss only to the terminal 20 that is expected to receive the groupcast transmission.

(Option B6)

Among the above-described option B1 through option B5, at least two options may be combined. For example, if the conditions of option B1 and option B2 are met, the transmitting terminal 20 may apply open-loop transmission power control based on a sidelink pathloss. For other cases, the transmitting terminal 20 need not apply open-loop transmission power control based on a sidelink pathloss. Alternatively, for example, if the conditions of option B1 or option B2 are met, the transmitting terminal 20 may apply open-loop transmission power control based on a sidelink pathloss. For other cases, the transmitting terminal 20 need not apply open-loop transmission power control based on a sidelink pathloss.

When it is possible to enhance reliability of communication by performing open-loop transmission power control based on a sidelink pathloss by applying any of the above-described methods of option B1 through option B6, the transmission power control is applied, and when it is determined that performing open-loop transmission power control would not be effective, it is not applied.

In Proposal B, RSRP may be replaced with at least one of a pathloss, RSRQ, and CSI, or RSRP may be information related to communication quality between the transmitting terminal 20 and the receiving terminal 20, and is not limited thereto. The availability of the RSRP at the transmitting terminal 20 may also mean that the transmitting terminal 20 has received and/or obtained the RSRP and/or any signal for obtaining the RSRP.

(Problem C)

When measuring a sidelink pathloss in NR sidelink communication, a reference signal for measuring the pathloss may be specified.

For release 15 NR-Uu, SS/PBCH blocks (SSB) and CSI-RS can be used as reference signals for measuring a pathloss. It is possible to configure SSB ID or CSI-RS ID for three information elements, which are PUCCH-PathlossReferenceRS, PUSCH-PathlossReferenceRS, and pathlossReferenceRS in SRS-ResourceSet, and to receive the reference signal to measure the pathloss. FIG. 15 is a diagram illustrating an example in which measurement of a pathloss on a reference signal based on a higher layer parameter PUSCH-PathlossRefereceRS is specified. FIG. 16 is a diagram illustrating an example of a PUSCH-PathlossReferenceRS information element. As illustrated in FIG. 16, an information element referenceSignal is included in the PUSCH-PathlossReferenceRS information element, and ssb-Index or csi-RS-Index can be configured.

In NR side-link communications, there may be a terminal 20 that does not transmit a sidelink SSB. Accordingly, it is not assumed that a sidelink SSB is applied as a reference signal for measuring a sidelink pathloss in NR sidelink communication. In addition, it is not assumed that the terminal 20 transmits CSI-RS in a stand-alone manner in NR sidelink communication. In other words, transmission of only CSI-RS is not allowed, and CSI-RS is transmitted simultaneously with transmission data, etc.

(Proposal C)

(Option C1)

Only sidelink DM-RS may be available as a reference signal for measuring a sidelink pathloss in NR sidelink communication.

Here, an index or a port of a sidelink DM-RS that can be used to measure a sidelink pathloss may be specified by a specification, (pre) configured as a higher layer parameter, configured by a PC5-RRC message transmitted by another terminal 20, which is sidelink RRC signaling, and/or specified by a network and/or another terminal 20. Alternatively, all DM-RS ports used for sidelink communication may be used for sidelink pathloss measurement.

(Option C2)

In NR sidelink communication, only a sidelink CSI-RS may be used as a reference signal for measuring a sidelink pathloss.

Here, an index or port of a sidelink CSI-RS that can be used to measure a sidelink pathloss may be specified by a specification, (pre) configured by a network, configured by a PC5-RRC message transmitted by another terminal 20, which is sidelink RRC signaling, and/or specified by a network. Alternatively, all CSI-RS ports used for sidelink communication may be used for sidelink pathloss measurement.

(Option C3)

In NR sidelink communications, a sidelink DM-RS can be used as a reference signal for measuring a sidelink pathloss, and, additionally, a sideline CSI-RS may be available. Here, use of a sidelink CSI-RS may depend on the implementation of the terminal 20.

Here, an index, or a part of a sidelink DM-RS that can be used to measure a sidelink pathloss, may be specified by a specification, (pre) configured by a network, configured by a PC5-RRC message transmitted by another terminal 20, which is sidelink RRC signaling, and/or specified by a network. Alternatively, all DM-RS ports used for sidelink communication may be used for sidelink pathloss measurement.

(Option C4)

In NR sidelink communication, a sidelink CSI-RS can be used as a reference signal to measure sidelink pathloss, and, additionally, a sidelink DM-RS can be used. Here, use of a sidelink DM-RS may depend on the implementation of the terminal 20.

Here, an index of a port of a sidelink CSI-RS that can be used to measure a sidelink pathloss may be specified by a specification, (pre) configured by a network, configured by a PC5-RRC message transmitted by another terminal 20, which is sidelink RRC signaling, and/or specified by a network. Alternatively, all CSI-RS ports used for sidelink communication may be used for sidelink pathloss measurement.

(Configuration of Pathloss Reference Signal (Pathloss Reference RS))

A sidelink SSB associated with PSSCH and/or a sidelink CSI-RS and/or a sidelink DM-RS may be specified by a specification as a pathloss reference RS for PSCCH/PSSCH/PSFCH transmitted from the transmitting terminal 20, and/or a pathloss reference RS for PSCCH/PSSCH/PSFCH transmitted from the receiving terminal 20, may be (pre) configured by a network, or may be configured by a PC5-RRC message transmitted by another terminal 20, which is sideline RRC signaling.

Suppose that a pathloss reference signal is not specified by a specification, not (pre) configured by a network, and not configured by a PC5-RRC message transmitted by another terminal 20, which is sidelink RRC signaling. In this case, a pathloss reference signal may be any of the following options Ci to Cv.

(Option Ci)

A DM-RS and/or CSI-RS used for broadcast transmission or a DM-RS and/or CSI-RS used for sidelink transmission prior to establishment of a PC5-RRC connection may be a pathloss reference signal.

(Option Cii)

All received DM-RS and/or CSI-RS may be a pathloss reference signal. As a modified example of option Cii, for example, DM-RS and/or CSI-RS transmitted from a specific terminal 20 may be a pathloss reference signal.

(Option Ciii)

When a TCI state is (pre) configured for a sidelink channel by a network, when a TCI state is configured for a sidelink channel by a PC5-RRC message transmitted from another terminal 20, which is sidelink RRC signaling, or when a TCI state is specified, QCL type-A RS and/or QCL type-B RS and/or QCL type-C RS and/or QCL type-D RS associated with the TCI state may be used as a pathloss reference signal. FIG. 17 is a diagram illustrating an example of correspondence between a TCI state and a reference signal.

(Option Civ)

Open-loop transmission power control based on a sidelink pathloss may be disabled and/or downlink open-loop transmission power control may be enabled.

(Option Cv)

A DM-RS and/or CSI-RS specified for L1-RSRP measurement and/or L3-RSRP measurement, a DM-RS and/or CSI-RS (pre) configured for L1-RSRP measurement and/or L3-RSRP measurement, or a DM-RS and/or CSI-RS configured for L1-RSRP measurement and/or L3-RSRP measurement by a PC5-RRC message may be a pathloss reference signal.

(Normalization of Power)

When transmitting CSI-RSs from two or more antenna ports, for example, when transmitting CSI-RSs from two antenna ports, it is assumed that transmit power of each CSI-RS is halved. In this case, if RSRP is derived by simply averaging the power, if CSI-RSs are transmitted from two antenna ports, the value of corresponding RSRP may be halved. In other words, it may not be possible to accurately calculate a pathloss. Accordingly, it is assumed that it is necessary to normalize power in accordance with the setting of the number of antenna ports, or the like.

(Option Ca)

The terminal 20 may perform RSRP measurements only if an RS is transmitted from a single RS port or if an RS is transmitted from a single CDM group.

(Option Cb)

Assuming that the following power normalization is performed, the terminal 20 may perform RSRP measurements regardless of a number of RS ports.

The RSRP calculation considers the number of RS ports and/or the transmit power from each port.

Case 1: If a number of RS ports is plural, and total transmit power is the same as the transmit power for a single RS port, instantaneous RSRP P1 may be calculated by adding RSRP from respective RS ports, P2, P3, . . . . Alternatively, the instantaneous PSPR P1 may be calculated by multiplying RSRP, P2, from a single RS port by a number of RS ports. Case 2: If a number of RS ports is plural, total transmit power differs from transmit power for a single RS port, and a difference is ZdB, instantaneous PSPR P1 may be calculated by subtracting ZdB from the sum of RSRP, P2, P3, . . . , from respective RS port. Alternatively, the instantaneous PSPR P1 may be calculated by multiplying RSRP, P2, from a single RS port by the number of RS ports and subtracting ZdB from the resulting product.

Alternatively, if the number of RS ports for RSRP measurement is plural, total transmit power may be specified (or determined, configured) so that the total transmit power is necessarily equal to transmit power from a single RS port.

(Option Cc)

The terminal 20 may perform RSRP measurements only if a reference signal and PSSCH data are frequency division multiplexed, or only if a reference signal and PSSCH data are not frequency division multiplexed.

(Option Cd)

The terminal 20 may perform RSRP measurements regardless of whether a reference signal and PSSCH data are frequency division multiplexed. If a reference signal and PSSCH data are frequency division multiplexed, the terminal 20 may compensate for RSRP based on a case where the reference signal is not frequency division multiplexed with the PSSCH data. Alternatively, if a reference signal is not frequency division multiplexed with PSSCH data, the terminal 20 may compensate for RSRP based on a case where the reference signal is frequency division multiplexed with the PSSCH data.

Note that whether a reference signal and PSSCH data are frequency division multiplexed may be specified by a specification, (pre) configured by a network, configured by a PC5-RRC message that is transmitted by another terminal 20, which is sidelink RRC signaling, or specified by DCI and/or SCI.

Furthermore, in the method of the above-described proposal C, the PSSCH data may imply a transport block transmitted on PSSCH, may imply CSI, or may imply any other information transmitted on PSSCH.

According to the method of the above-described proposal C, it is possible for the transmitting terminal 20 to recognize how the receiving terminal 20 performs RSRP measurement/calculation. Accordingly, the transmitting terminal 20 can appropriately calculate the pathloss.

A pathloss reference RS may be an L1-RSRP and/or L3-RSRP measurement, a reference signal for measuring L1-RSRP and/or L3-RSRP, a reference signal for measuring a pathloss, or a reference signal for open-loop transmission power control.

(Problem D)

Figure 18:
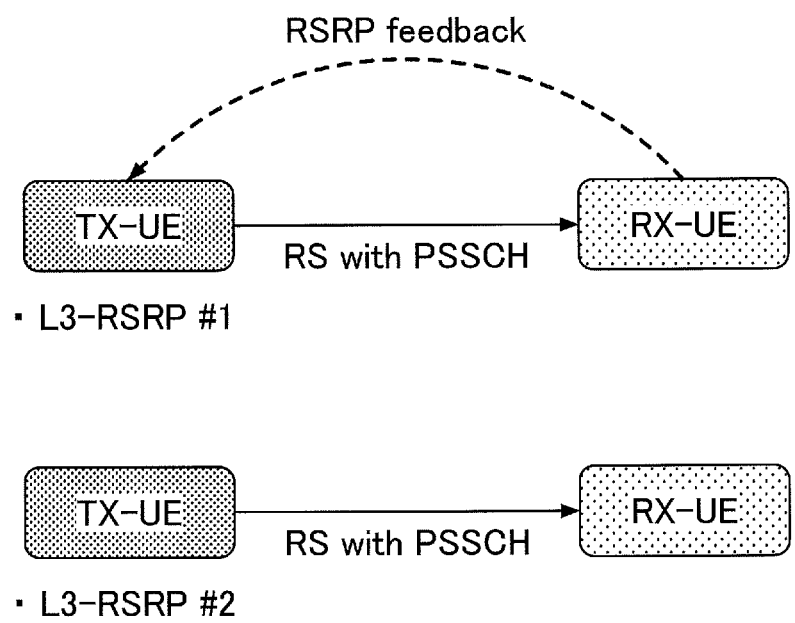
FIG. 18 is a diagram illustrating an example of two methods for obtaining L3-RSRP measurement results by a transmitting terminal.

FIG. 18 is a diagram illustrating an example of two methods for obtaining a L3-RSRP measurement result of the transmitting terminal 20. The transmitting terminal 20 may transmit a RS with PSSCH data (e.g., transport block and/or CSI) to the receiving terminal 20 and obtain RSRP feedback from the receiving terminal 20 to obtain a L3-RSRP measurement result. Alternatively, the transmitting terminal 20 may receive a RS with PSCCH data (e.g., transport block and/or CSI) transmitted from the receiving terminal 20 and calculate L3-RSRP based on the received RS. As described above, the transmitting terminal 20 can perform the open-loop transmission power control based on the L3-RSRP measurement result fed back from the receiving terminal 20, and the open-loop transmission power control can be performed based on the L3-RSRP calculated by the transmitting terminal 20. As described above, it may be specified, in the transmitting terminal 20, the use of the L3-RSRP fed back and the L3-RSRP calculated by the transmitting terminal 20 itself. In the following, the L3-RSRP fed back may be replaced with L3-RSRP based on power information that is fed back (e.g., L1-RSRP).

(Proposal D)

(Option D1)

The transmitting terminal 20 may use both the L3-RSRP fed back from the receiving terminal 20 and the L3-RSRP calculated by the transmitting terminal itself. For example, one of the L3-RSRP fed back from the receiving terminal 20 and the L3-RSRP calculated by the transmitting terminal 20 may be preferentially used.

For example, when the L3-RSRP fed back from the receiving terminal 20 is to be prioritized, if the transmitting terminal 20 obtains the L3-RSRP fed back from the receiving terminal 20 and the L3-RSRP calculated by the transmitting terminal 20 itself, the L3-RSRP fed back from the receiving terminal 20 may be used. Furthermore, when the L3-RSRP fed back from the receiving terminal 20 is prioritized, if the transmitting terminal 20 does not obtain the L3-RSRP fed back from the receiving terminal 20, the L3-RSRP calculated by the transmitting terminal 20 itself may be used.

Alternatively, for example, the transmitting terminal 20 may average and use the L3-RSRP fed back from the receiving terminal 20 and the L3-RSRP calculated by the transmitting terminal 20 itself. When averaging is applied, weighting may be performed as appropriate. How to use the L3-RSRP fed back from the receiving terminal 20 and the L3-RSRP calculated by the transmitting terminal 20 itself may depend on the implementation of the terminal 20.

(Option D2)

The transmitting terminal 20 may use only the L3-RSRP fed back from the receiving terminal 20. In this case, it is not assumed that the transmitting terminal 20 uses the L3-RSRP calculated by the transmitting terminal 20 itself for transmission power control of the transmitting terminal 20 itself. (Option D3)

The transmitting terminal 20 may use only the L3-RSRP calculated by the transmitting terminal 20 itself. In this case, it may be assumed that the L3-RSRP fed back from the receiving terminal 20 has been reported for purposes other than open-loop transmission power control. (Option D4)

In the specification, at least two options from the above-described Option 1 to Option 3 may be specified, any one of which may be (pre) configured by a network or configured by a PC5-RRC message transmitted by another terminal 20, which is sidelink RRC signaling.

As in the method of proposal D, by specifying, in the transmitting terminal 20, use of the L3-RSRP fed back and the L3-RSRP calculated by the transmitting terminal 20 itself, an operation of the terminal 20 for performing open-loop transmission power control can be clarified.

(Device Configuration)

Next, a functional configuration example of the base station 10 and the terminal 20 that perform the processing operations described above is described.

<Base Station 10>

Figure 19:
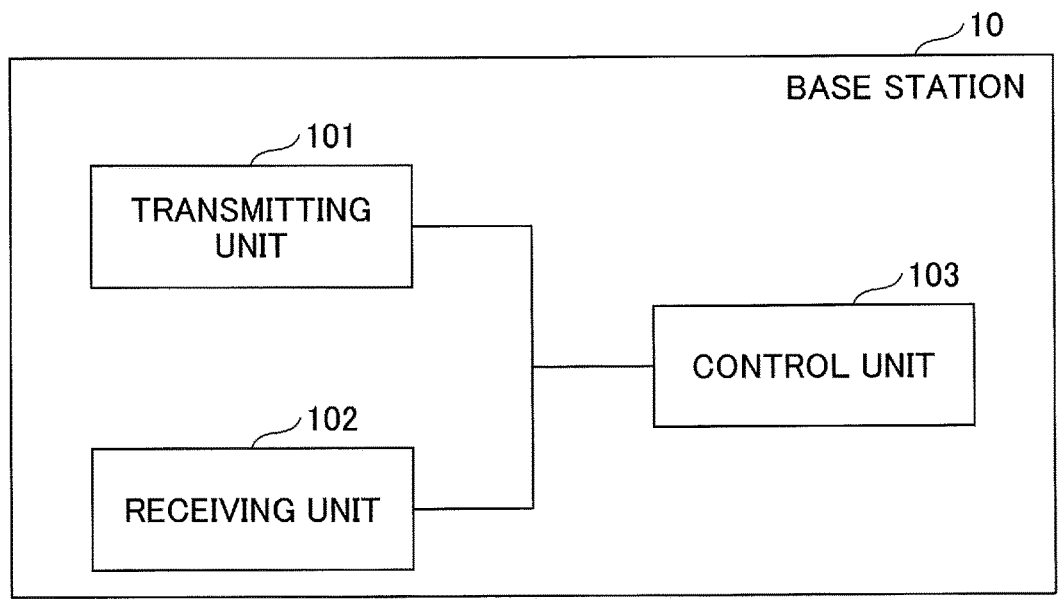
FIG. 19 is a diagram illustrating an example of α functional configuration of a base station according to an embodiment.

FIG. 19 is a diagram illustrating an example of α functional configuration of the base station 10. As illustrated in FIG. 19, the base station 10 includes a transmitting unit 101, a receiving unit 102, and a control unit 103. The functional configuration illustrated in FIG. 19 is merely one example. The functional division and names of functional units may be any division and names, provided that the operation according to the embodiments of the present invention can be performed. Note that the transmitting unit 101 may be referred to as a transmitter, and the receiving unit 102 may be referred to as a receiver.

The transmitting unit 101 includes a function for generating a signal to be transmitted to the terminal and transmitting the signal through radio. The receiving unit 102 includes a function for receiving various types of signals transmitted from the terminal 20 through radio and obtaining a higher layer signal from the received signal. Furthermore, the receiving unit 102 includes a function for measuring a received signal to obtain a quality value.

The control unit 103 controls the base station 10. Note that a function of the control unit 103 related to transmission may be included in the transmitting unit 101 and a function of the control unit 103 related to reception may be included in the receiving unit 102.

For example, the control unit 103 of the base station 10 may generate a parameter for configuring the terminal 20 so that the terminal 20 uses only a downlink (DL: between the terminal 20 and the base station 10 (gNB)) pathloss; only a sidelink (SL: between transmitting terminal 20 and the receiving terminal 20) pathloss; or a downlink pathloss and a sidelink pathloss for NR sidelink closed-loop transmission power control, and the transmitting unit 101 may transmit a signal including the command to the terminal 20.

For example, the control unit 103 of the base station 10 may determine that the terminal 20 boosts the transmit power of the CSI-RS and/or PT-RS, and the control unit 103 may set an amount of increase in the transmit power of the CSI-RS and/or an amount of increase in the transmit power of the PT-RS (e.g., the value of α and/or the value of β); and the transmitting unit 101 may transmit a signal including the amount of increase (the value of α and/or the value of β) to the terminal 20.

For example, the control unit 103 of the base station 10 may set a threshold value X for a number of terminals 20 within a group for determining whether to apply open-loop transmission power control based on a sidelink pathloss in NR groupcast communication, and the transmitting unit may transmit a signal including the threshold value X to the terminal 20.

For example, the control unit 103 of the base station 10 may configure a port or index of a sidelink DM-RS or a sidelink CSI-RS that can be used to measure a sidelink pathloss, and the transmitting unit 101 may transmit a signal including the port or index to the terminal 20.

For example, the control unit 103 of the base station 10 may configure a sidelink SSB and/or a sidelink CSI-RS and/or a sidelink DM-RS associated with PSSCH as a pathloss reference RS transmitted from the transmitting terminal 20 and/or as a pathloss reference RS of PSCCH/PSSCH/PSFCH transmitted from the receiving terminal 20, and the transmitting unit 101 may transmit the signal including the configuration information to the terminal 20.

<Terminal 20>

Figure 20:
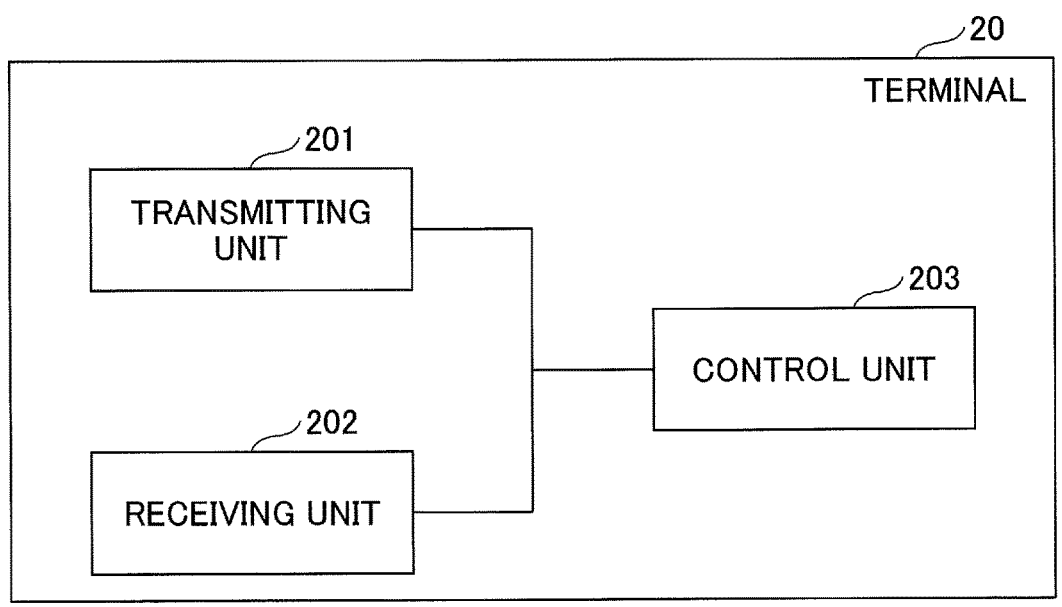
FIG. 20 is a diagram illustrating an example of α functional configuration of a terminal according to an embodiment.

FIG. 20 is a diagram illustrating an example of α functional configuration of the terminal 20. As illustrated in FIG. 20, the terminal 20 includes a transmitting unit 201, a receiving unit 202, and a control unit 203. The functional configuration illustrated in FIG. 20 is merely an example. The functional division and names of functional units may be any division and names, provided that the operation according to the embodiments can be performed. Note that the transmitting unit 201 may be referred to as a transmitting unit, and the receiving unit 202 may be referred to as a receiver. Furthermore, the terminal 20 may be the transmitting terminal 20A or the receiving terminal 20B. Furthermore, the terminal 20 may be the scheduling terminal 20.

The transmitting unit 201 generates a transmitting signal from transmitting data and transmits the transmitting signal through radio. The receiving unit 202 receives various types of signals and obtains a higher layer signal from the received physical layer signal. The receiving unit 220 includes a function for measuring a received signal and obtaining a quality value.

The control unit 203 controls of the terminal 20. Note that the function of the control unit 203 related to transmission may be included in the transmitting unit 201, and the function of the control unit 203 related to reception may be included in the receiving unit 202.

For example, the control unit 203 of the terminal 20 may be able to set a value of transmit power of a CSI-RS associated with PSSCH to a value different from a value of transmit power allocated to PSCCH. The control unit 203 of the terminal 20 may also be able to set a value of transmit power of α PT-RS associated with PSSCH to a value different from a value of transmit power allocated to the PSSCH.

For example, the receiving unit 202 of the terminal 20 may receive information indicating to boost transmit power of a CSI-RS and/or a PT-RS and information indicating an amount of increase in transmit power of a CSI-RS and/or an amount of increase in transmit power of a PT-RS (e.g., the value of α and/or the value of β), and the control unit 203 may boost the transmit power of the CSI-RS and/or PT-RS based on the amount of increase received by the receiving unit 202 (the value of α and/or the value of β).

For example, the control unit 203 of the terminal 20 may set transmit power of a CSI-RS and/or PT-RS associated with PSSCH to be the same as transmit power of PSSCH.

For example, the control unit 203 of the terminal 20 may perform the open-loop transmission power control based on a sidelink pathloss for NR sidelink groupcast communication. For example, the control unit 203 of the terminal 20 may apply open-loop transmission power control based on a sidelink pathloss when RSRP of all the receiving terminals 20 within the group can be used in the NR sidelink groupcast communication. For example, the control unit 203 of the terminal 20 may disable open-loop transmission power control based on a sidelink pathloss when RSRP of at least one of the receiving terminals 20 within the group cannot be used.

For example, the control unit 203 of the terminal 20 may apply open-loop transmission power control based on a sidelink pathloss when ACK/NACK feedback of groupcast for NR sidelink groupcast communication is enabled. For example, when groupcast ACK/NACK feedback is disabled, the control unit 203 of the terminal 20 need not apply open-loop transmission power control based on a sidelink pathloss.

For example, the control unit 203 of the terminal 20 may apply open-loop transmission power control based on a sidelink pathloss when a number of the terminals 20 within the group is less than a threshold value or less than or equal to the threshold value X in the NR sidelink groupcast communication.

For example, the control unit 203 of the terminal 20 may apply open-loop transmission power control based on a sidelink pathloss when distance-based HARQ is applied and RSRP of the receiving terminal 20 for which HARQ feedback is required can be used.

For example, the control unit 203 of the terminal 20 may choose to use at least one of a sidelink DM-RS and a sidelink CSI-RS as a reference signal for measuring a sidelink pathloss in NR sidelink communication.

For example, the control unit 203 of the transmitting terminal 20 may select at least one of L3-RSRP fed back from the receiving terminal 20 and L3-RSRP calculated by the transmitting terminal 20 itself to perform open-loop transmission power control.

<Hardware Configuration>

The block diagrams (FIG. 19 to FIG. 20) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 21:
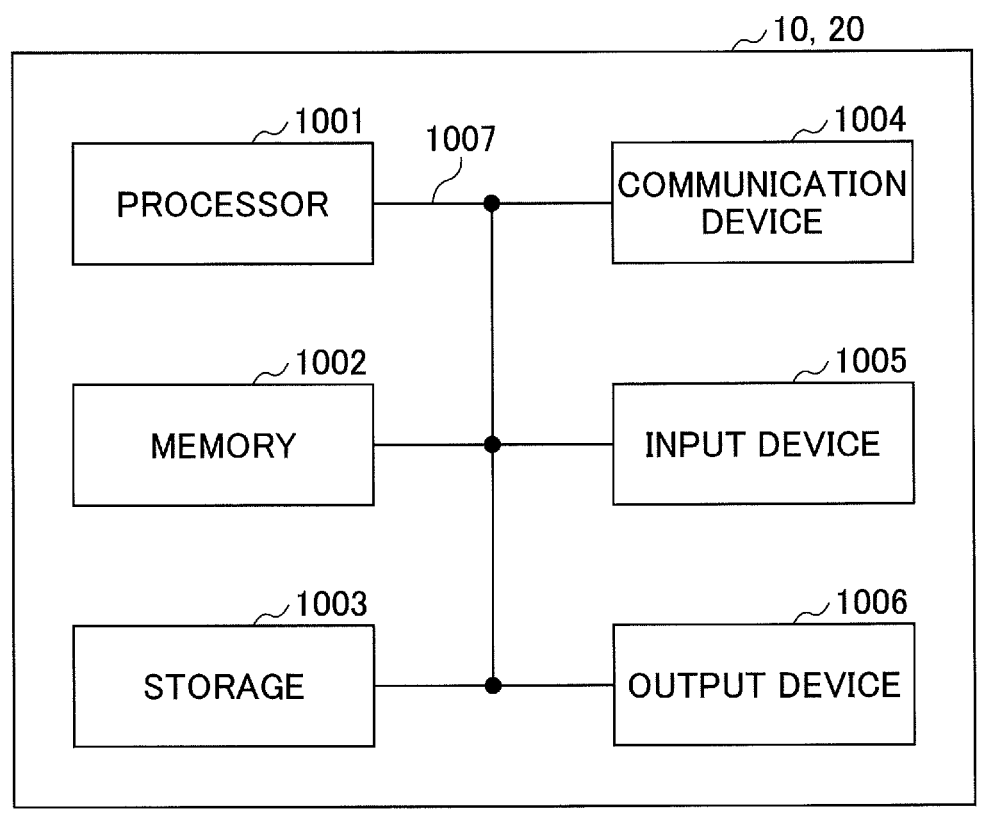
FIG. 21 is a diagram illustrating an example of α hardware configuration of a base station and a terminal according to an embodiment.

For example, the base terminal 20 and the base station 10 according to an embodiment of the present invention may function as computers performing the process of the radio communication according to the embodiment of the present invention. FIG. 21 is a diagram illustrating an example of a hardware configuration of the terminal and the base station 10 according to the embodiment. Each of the above-described terminal 20 and the base station 10 may be physically configured as a computer device including a processor 1001, a memory 1002, a storage device 1003, a communication device 1004, an input device 1005, an output device 1006, a bus 1007, or the like.

Note that, in the following description, the term "device" can be replaced with a circuit, a device, a unit, or the like. The hardware configuration of the terminal 20 and the base station 10 may be configured to include one or more of the devices depicted in the figures, which are indicated by 1001 through 1006, or may be configured without some devices.

Each function of the terminal 20 and the base station 10 is implemented by loading predetermined software (program) on hardware, such as the processor 1001 and the memory 1002, so that the processor 1001 performs computation and controls communication by the communication device 1004, and at least one of reading and writing of data in the memory 1002 and the storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module, data, etc., from at least one of the storage 1003 and the communication device 1004 to the memory 1002, and executes various processes according to these. As the program, a program is used which causes a computer to execute at least a part of the operations described in the above-described embodiment. For example, the control unit 203 of the terminal 20 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, or the like, which can be executed for implementing the radio communication method according to the embodiments of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, a magnetic strip, and the like. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the memory 1002, is also connected by the bus for communicating information. The bus 1007 may be formed of a single bus or may be formed of different buses between devices.

The terminal 20 and the base station 10 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of the Embodiments

In this specification, at least the following terminal and communication method are disclosed.

A terminal including a control unit that sets, when data transmitted on a sidelink shared channel is frequency division multiplexed with a sidelink reference signal in a symbol to which the sidelink shared channel is mapped, a first value of $\alpha$ transmit power for transmitting the reference signal to a same value as or a different value from a second value of $\alpha$ transmit power for transmitting the data; and a transmitting unit that transmits the reference signal and the data, wherein the transmitting unit applies the first value of the transmit power to the reference signal and applies the second value of the transmit power to the data.

The first value of the transmit power for transmitting the reference signal is determined based on a first occupancy rate of the reference signal within the symbol, and the second value of the transmit power for transmitting the data is determined based on a second occupancy rate of the data in the symbol. With the above-described configuration, control can be clarified for boosting transmit power of a reference signal.

A receiving unit may further be included that receives a signal indicating to set the first value to a same value as or a different value from the second value, and the control unit may set the first value to the same value as or the different value from the second value in accordance with the instruction of the signal received by the receiving unit.

With the above-described configuration, for example, an operation becomes possible such that, when a CSI-RS resource is small, transmit power of the CSI-RS is boosted, and when a CSI-RS resource is large, transmit power of the CSI-RS is set to a value that is the same as that of transmit power allocated to PSSCH.

The control unit may map the reference signal and a sidelink control signal to a radio resource so that the reference signal and the sidelink control signal do not overlap in a time domain.

When a reference signal and a sidelink control signal overlap in a time domain, a signal to be prioritized can be boosted. However, in this case, a formula for control the transmit signal is complicated, and implementation of a device may be complicated. With the above-described configuration, complication of the formula and complication of the implementation of the device can be avoided.

The control unit may always set the first value to the same value as the second value.

With the above-described configuration, implementation of a device can be made easier, and a change in a specification can be reduced.

A communication method by a terminal, the method including setting, when data transmitted on a sidelink shared channel is frequency division multiplexed with a sidelink reference signal in a symbol to which the sidelink shared channel is mapped, a first value of $\alpha$ transmit power for transmitting the reference signal to a same value as or a different value from a second value of $\alpha$ transmit power for transmitting the data; and transmitting the reference signal and the data, wherein the transmitting applies the first value of the transmit power to the reference signal and applies the second value of the transmit power to the data.

Supplemental Embodiments

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the terminal 20 and the base station 10 are described using functional block diagrams, but such devices may be implemented in hardware, software, or a combination thereof. Software operated by a processor included in the terminal 20 in accordance with embodiments of the present invention and software operated by a processor included in the base station 10 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA)), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station 10 may be performed by an upper node in some cases. It is apparent that in a network consisting of one or more network nodes having the base station 10, various operations performed for communicating with the terminal may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information, or the like may be stored in a specific location (e.g., memory) or managed using management tables. Input and output information, or the like may be overwritten, updated, or added. Output information, or the like may be deleted. The input information, or the like may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like, which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," or the like may be used interchangeably. The base stations may be referred to in terms such as macro-cell, small-cell, femto-cell, pico-cell, or the like.

The base station can accommodate one or more (e.g., three) cells. Where the base station accommodates a plurality of cells, the entire coverage area of the base station can be divided into a plurality of smaller areas, each smaller area can also provide communication services by means of α base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", "terminal", or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be read by the user terminal. For example, various aspects/embodiments of the present disclosure may be applied to a configuration in which communication between the base stations and the user terminal is replaced with communication between multiple user terminals (e.g., may be referred to as D2D (Device-to-Device) or V2X (Vehicle-to-Everything)). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel.

Similarly, the user terminal according to the present disclosure may be replaced with a base station. In this case, a configuration may be such that, the function included in the above-described user terminal 20 may be included in the base station 10.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, and the like.

A slot may be formed of, in a time domain, one or more symbols (Orthogonal Frequency Division Multiplexing (OFDM) symbols, or Single Carrier Frequency Division Multiple Access (SC-FDMA) symbols). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for allocating radio resources (such as a frequency bandwidth, transmission power, or the like that can be used in each terminal 20) in units of TTIs to each terminal 20. Note that the definition of the TTI is not limited to this.

The TTI may be a transmission time unit, such as a channel coded data packet (transport block), a code block, a codeword or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel.8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (partial TTI or fractional TTI), a shortened subframe, a short subframe, a mini-slot, a sub-slot, a slot, or the like.

Note that a long TTI (e.g., a normal TTI or a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth, or the like) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE is may not assume that a predetermined signal/channel is communicated outside the active BWP. Note that "cell," "carrier," etc. in the present disclosure may be replaced with "BWP."

The structures of the above-described radio frame, subframe, slot, mini-slot, symbol, or the like, are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; and the number of symbols, the symbol length, the cyclic prefix (CP: Cyclic Prefix) length, or the like, within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated," "coupled," or the like may also be interpreted similarly.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

LIST OF REFERENCE SYMBOLS

| | |
|---|---|
| 10 | base station |
| 20 | terminal |
| 101 | transmitting unit |
| 102 | receiving unit |
| 103 | control unit |
| 201 | transmitting unit |
| 202 | receiving unit |
| 203 | control unit |
| 1001 | processor |
| 1002 | memory |
| 1003 | storage |
| 1004 | communication device |
| 1005 | input device |
| 1006 | output device |

The invention claimed is:

1. A terminal comprising:
a processor that adjusts, in a shared channel in a device-to-device communication, transmission power per resource element for transmission data and transmission power per resource element for at least one of a demodulation reference signal associated with the shared channel in the device-to-device communication or a phase tracking reference signal associated with the shared channel in the device-to-device communication, so that the transmission power per resource element for the transmission data and at least one of the transmission power per resource element for the demodulation reference signal or the transmission power per resource element for the phase tracking reference signal are a same value; and
a transmitter that transmits the transmission data and the at least one of the demodulation reference signal or the phase tracking reference signal by using the transmission power adjusted by the processor,
wherein total transmission power of transmission power per resource element for the shared channel in the device-to-device communication includes at least one of the transmission power for the transmission data, the transmission power for the demodulation reference signal, or the transmission power for the phase tracking reference signal, and
wherein the processor adjusts the transmission power for the transmission data, the transmission power for the demodulation reference signal, and the transmission power for the phase tracking reference signal, so that transmission power per resource element for the transmission data summed over all transmit ports used for the transmissions and at least one of transmission power per resource element for the demodulation reference signal summed over all the transmit ports or transmission power per resource element for the phase tracking reference signal summed over all the transmit ports are a same value.

2. The terminal according to claim 1, wherein the processor maps a sidelink control signal and the demodulation reference signal onto a radio resource, so that the sidelink control information does not overlap the demodulation reference signal in a time domain.

3. A system comprising:
a first terminal; and
a second terminal,
wherein the first terminal includes:
- a processor that adjusts, in a shared channel in a device to-device communication, transmission power per resource element for transmission data and transmission power per resource element for at least one of a demodulation reference signal associated with the shared channel in the device-to-device communication or a phase tracking reference signal associated with the shared channel in the device-to-device communication, so that the transmission power per resource element for the transmission data and at least one of the transmission power per resource element for the demodulation reference signal or the transmission power per resource element for the phase tracking reference signal are a same value, and
- a transmitter that transmits the transmission data and the at least one of the demodulation reference signal or the phase tracking reference signal by using the transmission power adjusted by the processor,
wherein total transmission power of transmission power per resource element for the shared channel in the device-to-device communication includes at least one of the transmission power for the transmission data, the transmission power for the demodulation reference signal, or the transmission power for the phase tracking reference signal, and
wherein the processor adjusts the transmission power for the transmission data, the transmission power for the demodulation reference signal, and the transmission power for the phase tracking reference signal, so that transmission power per resource element for the transmission data summed over all transmit ports used for the transmissions and at least one of transmission power per resource element for the demodulation reference signal summed over all the transmit ports or transmission power per resource element for the phase tracking reference signal summed over all the transmit ports are a same value, and
wherein the second terminal includes a receiver that receives the transmission data and the at least one of the demodulation reference signal or the phase tracking reference signal in the shared channel in the device-to-device communication transmitted by the first terminal.

4. A communication method executed by a terminal, the method comprising:
adjusting, in a shared channel in a device-to-device communication, transmission power per resource element for transmission data and transmission power per resource element for at least one of a demodulation reference signal associated with the shared channel in the device-to-device communication or a phase tracking reference signal associated with the shared channel in the device-to-device communication, so that the transmission power per resource element for the transmission data and at least one of the transmission power per resource element for the demodulation reference signal or the transmission power per resource element for the phase tracking reference signal are a same value; and
transmitting the transmission data and the at least one of the demodulation reference signal or the phase tracking reference signal by using the transmission power adjusted by the adjusting,
wherein total transmission power of transmission power per resource element for the shared channel in the device-to-device communication includes at least one of the transmission power for the transmission data, the transmission power for the demodulation reference signal, or the transmission power for the phase tracking reference signal, and
wherein the terminal adjusts the transmission power for the transmission data, the transmission power for the demodulation reference signal, and the transmission power for the phase tracking reference signal, so that transmission power per resource element for the transmission data summed over all transmit ports used for the transmissions and at least one of transmission power per resource element for the demodulation reference signal summed over all the transmit ports, for or transmission power per resource element for the phase tracking reference signal summed over all the transmit ports are a same value.

* * * * *